United States Patent
Shi et al.

(10) Patent No.: US 11,418,293 B2
(45) Date of Patent: Aug. 16, 2022

(54) HYBRID AUTOMATIC REPEAT REQUEST HARQ FEEDBACK METHOD AND APPARATUS

(71) Applicant: HUAWEI TECHNOLOGIES CO., LTD., Guangdong (CN)

(72) Inventors: Jie Shi, Shenzhen (CN); Xingwei Zhang, Lund (SE); Chao Li, Beijing (CN); Shulan Feng, Beijing (CN)

(73) Assignee: Huawei Technologies Co., Ltd., Guangdong (CN)

( * ) Notice: Subject to any disclaimer, the term of this patent is extended or adjusted under 35 U.S.C. 154(b) by 270 days.

(21) Appl. No.: 16/787,782

(22) Filed: Feb. 11, 2020

(65) Prior Publication Data

US 2020/0177321 A1 Jun. 4, 2020

Related U.S. Application Data

(63) Continuation of application No. PCT/CN2018/084060, filed on Apr. 23, 2018.

(30) Foreign Application Priority Data

Aug. 11, 2017 (CN) .......................... 201710687835.2

(51) Int. Cl.
*H04L 1/18* (2006.01)
*H04L 5/00* (2006.01)
(Continued)

(52) U.S. Cl.
CPC ............ *H04L 1/1819* (2013.01); *H04L 5/001* (2013.01); *H04W 72/042* (2013.01);
(Continued)

(58) Field of Classification Search
CPC .. H04L 1/1819; H04L 5/001; H04W 72/0413; H04W 72/042; H04W 72/1257
See application file for complete search history.

(56) References Cited

U.S. PATENT DOCUMENTS

2012/0176996 A1* 7/2012 Kim .................. H04W 72/0413
370/329
2012/0300741 A1* 11/2012 Han ...................... H04L 5/0055
370/329
(Continued)

FOREIGN PATENT DOCUMENTS

CN 102404094 A 4/2012
CN 104521304 A 4/2015
(Continued)

OTHER PUBLICATIONS

Huawei, HiSilicon, "Structure of 1-symbol PUCCH for more than 2bits," 3GPP TSG RAN WG1 Meeting #89, R1-1706951; Hangzhou, China, May 15-19, 2017, 4 pages.
(Continued)

*Primary Examiner* — Jael M Ulysse
(74) *Attorney, Agent, or Firm* — Fish & Richardson P.C.

(57) ABSTRACT

Example hybrid automatic repeat request (HARQ) feedback methods and apparatus are provided. One example method includes a network device obtains first indication information used to instruct a terminal device to feed back HARQ feedback information. The first indication information is obtained based on information amounts corresponding to a data channel and/or information amounts corresponding to a control channel that are in a reference slot and at least one first slot. The reference slot and the at least one first slot each correspond to a different component carrier of a plurality of component carriers serving the terminal. The reference slot and the at least one first slot have a same start moment, and at least two of the plurality of component carriers have different slot lengths. The network device sends, to the terminal device, indication information used to indicate at least the first indication information.

20 Claims, 11 Drawing Sheets

(51) Int. Cl.
*H04W 72/04* (2009.01)
*H04W 72/12* (2009.01)

(52) U.S. Cl.
CPC ... *H04W 72/0413* (2013.01); *H04W 72/0446* (2013.01); *H04W 72/1257* (2013.01)

(56) References Cited

U.S. PATENT DOCUMENTS

| | | |
|---|---|---|
| 2013/0336160 A1 | 12/2013 | Yin et al. |
| 2014/0105191 A1* | 4/2014 | Yang ............... H04L 1/1867 370/336 |
| 2014/0241319 A1* | 8/2014 | Lee ............... H04L 1/0026 370/329 |
| 2014/0286276 A1 | 9/2014 | Lunttila et al. |
| 2015/0016410 A1* | 1/2015 | Lee ............... H04L 1/1854 370/329 |
| 2015/0063179 A1* | 3/2015 | Yang ............... H04W 72/0413 370/280 |
| 2015/0146642 A1* | 5/2015 | Seo ............... H04L 1/06 370/329 |
| 2015/0195072 A1* | 7/2015 | Seo ............... H04L 1/1854 370/329 |
| 2016/0080094 A1* | 3/2016 | Kim ............... H04L 5/0037 455/63.1 |
| 2016/0128028 A1* | 5/2016 | Mallik ............... H04W 72/042 370/336 |
| 2016/0226639 A1* | 8/2016 | Xiong ............... H04L 5/0053 |
| 2016/0338046 A1* | 11/2016 | Chen ............... H04L 5/0048 |
| 2016/0360535 A1* | 12/2016 | Kim ............... H04W 72/048 |
| 2017/0064706 A1* | 3/2017 | Patel ............... H04W 28/0236 |
| 2017/0208575 A1* | 7/2017 | Chen ............... H04L 5/0083 |
| 2017/0208588 A1* | 7/2017 | Park ............... H04W 72/0446 |
| 2017/0265166 A1* | 9/2017 | Hosseini ............... H04W 72/0446 |
| 2017/0272199 A1* | 9/2017 | Dinan ............... H04W 72/042 |
| 2017/0303284 A1 | 10/2017 | Xu et al. |
| 2017/0367046 A1* | 12/2017 | Papasakellariou .... H04L 5/0048 |
| 2018/0006790 A1* | 1/2018 | Park ............... H04L 1/1671 |
| 2018/0019843 A1* | 1/2018 | Papasakellariou ............... H04W 72/1278 |
| 2018/0084573 A1 | 3/2018 | Jiang et al. |
| 2018/0145796 A1 | 5/2018 | Liang et al. |
| 2018/0227885 A1* | 8/2018 | Lee ............... H04W 72/042 |
| 2018/0262295 A1* | 9/2018 | Oketani ............... H04L 5/0055 |
| 2018/0270022 A1* | 9/2018 | Sun ............... H04L 1/1893 |
| 2018/0278373 A1* | 9/2018 | Wang ............... H04L 5/0055 |
| 2018/0279339 A1* | 9/2018 | Löhr ............... H04W 52/34 |
| 2018/0317207 A1* | 11/2018 | Liao ............... H04L 5/0053 |
| 2018/0331792 A1* | 11/2018 | Yang ............... H04W 72/0413 |
| 2019/0037586 A1* | 1/2019 | Park ............... H04L 1/0031 |
| 2019/0098605 A1* | 3/2019 | Seo ............... H04L 5/0048 |
| 2019/0116608 A1* | 4/2019 | Kim ............... H04W 72/04 |
| 2019/0150181 A1* | 5/2019 | Kim ............... H04W 72/1289 370/329 |
| 2019/0191437 A1* | 6/2019 | Kusashima ............... H04W 80/02 |
| 2020/0169375 A1* | 5/2020 | Yi ............... H04W 72/0446 |
| 2020/0221455 A1* | 7/2020 | Lei ............... H04W 72/0446 |

FOREIGN PATENT DOCUMENTS

| | | |
|---|---|---|
| CN | 105515733 A | 4/2016 |
| CN | 106301670 A | 1/2017 |
| CN | 106549734 A | 3/2017 |
| EP | 2615762 A1 | 7/2013 |
| WO | 2010135955 A1 | 12/2010 |
| WO | 2016161977 A1 | 10/2016 |

OTHER PUBLICATIONS

3GPP TS 38.321 V0.0.3 (May 2017), "3rd Generation Partnership Project; Technical Specification Group Radio Access Network; NR; Medium Access Control (MAC) protocol specification (Release 15)," May 2017, 20 pages.

3GPP TS 38.212 V0.0.0 (May 2017), "3rd Generation Partnership Project; Technical Specification Group Radio Access Network; NR; Multiplexing and channel coding(Release 15)," May 2017, 10 pages.

3GPP TS 38.331 V0.0.4 (Jun. 2017), "3rd Generation Partnership Project; Technical Specification Group Radio Access Network; NR; Radio Resource Control (RRC); Protocol specification (Release 15)," Jun. 2017, 22 pages.

Office Action issued in Chinese Application No. 201710687835.2 dated Dec. 25, 2019, 13 pages (with English translation).

Extended European Search Report issued in European Application No. 18844435.0 dated Apr. 22, 2020, 6 pages.

PCT International Search Report and Written Opinion issued in International Application No. PCT/CN2018/084060 dated Jun. 27, 2018, 15 pages (with English translation).

* cited by examiner

|  | Slot n | Slot (n + 1) | Slot (n + 2) | Slot (n + 3) |
|---|---|---|---|---|
| CC0 CBG = 4 | (1/3) | (4/6) | | |
| CC1 CBG = 2 | | (5/6) | | (10/13) |
| CC2 CBG = 1 | (2/3) | (6/6) | | |
| CC3 CBG = 2 | | | (7/9) | |
| CC4 CBG = 3 | | | | |
| CC5 CBG = 3 | (3/3) | | | (11/13) |
| CC6 CBG = 2 | | | (8/9) | (12/13) |
| CC7 CBG = 3 | | | (9/9) | (13/13) |

←————— Aggregation window —————→

FIG. 1

| CC0 | DL | DL | DL | DL | DL | DL |
| CC1 | DL | UL | DL | DL | DL | DL |
| CC2 | DL | DL | DL | DL | UL | DL | DL | DL | DL | UL | DL | DL |
| ⋮ | | | | | | |
| CCn | DL | DL | DL |

←————— Aggregation window —————→

FIG. 2

HYBRID AUTOMATIC REPEAT REQUEST HARQ FEEDBACK METHOD AND APPARATUS

CROSS-REFERENCE TO RELATED APPLICATIONS

This application is a continuation of International Application No. PCT/CN2018/084060, filed on Apr. 23, 2018, which claims priority to Chinese Patent Application No. 201710687835.2, filed on Aug. 11, 2017. The disclosure of the aforementioned applications are hereby incorporated by reference in their entireties.

TECHNICAL FIELD

This application relates to the field of communications technologies, and in particular, to a hybrid automatic repeat request HARQ feedback method and apparatus.

BACKGROUND

In a next generation radio access system (Next generation RAT (NR)), a hybrid automatic repeat request (HARQ) timing relationship may be configured dynamically. In an example, a terminal device receives, in the $n^{th}$ slot, a downlink data packet sent by a network device, and feeds back HARQ feedback information in the $4^{th}$ slot following the $n^{th}$ slot, while the terminal device receives, in the $(n+1)^{th}$ slot, a downlink data packet sent by the network device, and may feed back HARQ feedback information in the $3^{rd}$ slot following the $(n+1)^{th}$ slot.

When the network device allocates a plurality of serving cells to the terminal device, the plurality of serving cells correspond to different component carriers (CC), for example, a CC0, a CC1, and a CC3. Each component carrier corresponds to a different physical downlink shared channel (PDSCH). When receiving a downlink data packet sent by using each PDSCH, the terminal device correspondingly needs to feed back at least one piece of acknowledgement/negative acknowledgement (ACK/NACK) information. Because the HARQ timing relationship may be configured dynamically. ACK/NACK information corresponding to PDSCHs of different component carriers at different moments is sent by using one physical uplink control channel (PUCCH). In this case, to enable the network device to identify feedback information from the terminal device, at least a bit quantity fed back by the terminal device needs to be determined between the network device and the terminal device.

However, in the prior art, a network device and a terminal device determine a feedback bit quantity in a scenario in which component carriers have a same slot length. However, in an NR system, different component carriers may have different slot lengths. Therefore, a feedback solution for the same slot length in the prior art is no longer applicable to a similar scenario in the NR system in which the component carriers have the different slot lengths.

SUMMARY

This application provides a hybrid automatic repeat request HARQ feedback method and apparatus, to improve feedback accuracy of feeding back HARQ feedback information by a terminal device.

According to a first aspect, an embodiment of this application provides a hybrid automatic repeat request HARQ feedback method. The method may be performed by a network device, for example, a base station. The method includes: obtaining, by the network device, first indication information used to instruct a terminal device to feed back HARQ feedback information, where the first indication information is obtained based on information amounts corresponding to a data channel and/or information amounts corresponding to a control channel that are in a reference slot and at least one first slot, the reference slot and the at least one first slot each correspond to a different component carrier of a plurality of component carriers in which the terminal is scheduled, and the reference slot and the at least one first slot have a same start moment, and at least two of the plurality of component carriers have different slot lengths; and sending, by the network device to the terminal device, indication information used to indicate at least the first indication information. The terminal device can obtain the indication information used to indicate at least the first indication information, and send the HARQ feedback information to the terminal device based on the indication information.

In this embodiment of this application, when at least two of the plurality of component carriers have the different slot lengths, the network device obtains the first indication information based on the information amounts corresponding to the data channel and/or the information amounts corresponding to the control channel that are in the reference slot and the at least one first slot having the same start moment as the reference slot, so that the terminal device can determine the HARQ feedback information based on the first indication information. In this way, the technical solution provided in this embodiment of this application can be applicable to a network similar to 5G in which component carriers have different slot lengths.

In a possible design, when there are a plurality of reference slots accumulated from a start moment of an aggregation window, the first indication information is the information amounts corresponding to the data channel and/or the information amounts corresponding to the control channel that are in the reference slot and the at least one first slot and information amounts corresponding to the data channel and/or information amounts corresponding to the control channel that are in slots, preceding the reference slot, corresponding to the plurality of component carriers; and the aggregation window is a set of downlink slots in which the HARQ feedback information is fed back by using one uplink control channel or one piece of uplink control information.

In this embodiment of this application, when there are the plurality of reference slots accumulated from the start moment of the aggregation window, the first indication information further includes a sum of information amounts corresponding to the data channel and/or information amounts corresponding to the control channel that are in time domain. Alternatively, this step may be expressed as follows: When there are the plurality of reference slots accumulated from the start moment of the aggregation window, the first indication information is information amounts corresponding to the data channel and/or information amounts corresponding to the control channel that are in each of the reference slots and at least one corresponding first slot.

In a possible design, the network device obtains second indication information used to instruct the terminal device to feed back the HARQ feedback information. The second indication information is obtained from information amounts corresponding to the data channel and/or information amounts corresponding to the control channel that are accumulated in a frequency-first manner from a specific moment of the aggregation window and the 1$^{st}$ component carrier of the plurality of component carriers to a current component carrier to which a second slot corresponds, and the second slot is obtained from the reference slot and the at least one first slot, and/or is obtained from other slots of the component carriers.

In this embodiment of this application, the network device further obtains the second indication information used to instruct the terminal device to feed back the HARQ feedback information, so that the terminal device can determine the HARQ feedback information by using the first indication information and the second indication information, and determine a feedback sequence and a feedback bit quantity of the HARQ feedback information, thereby improving feedback accuracy of the terminal device. For example, the specific moment is the start moment of the aggregation window.

In a possible design, the sending, by the network device to the terminal device, indication information used to indicate at least the first indication information includes: sending, by the network device to the terminal device in a scheduled slot and/or dedicated slot in the aggregation window, indication information used to indicate the first indication information and/or the second indication information; and/or sending, by the network device to the terminal device in a slot outside the aggregation window, the indication information used to indicate the first indication information.

In this embodiment of this application, the base station may feed back, to the terminal device in a plurality of manners, the indication information used to indicate at least the first indication information. When the network device sends, to the terminal device in the scheduled slot and/or dedicated slot in the aggregation window, the indication information used to indicate the first indication information and the second indication information, the terminal can be enabled to accurately determine the sequence and the feedback bit quantity of the HARQ feedback information. The network device sends, to the terminal device in the scheduled slot and/or dedicated slot in the aggregation window, the indication information used to indicate the first indication information and the second indication information; and sends, outside the aggregation window, the indication information used to indicate the first indication information. Because the indication information used to indicate the first indication information is sent to the terminal device for a plurality of times, reliability of sending the first indication information by the network device can be improved, and accuracy of feeding back the HARQ feedback information by the terminal can further be improved. Alternatively, the network device may send, to the terminal device outside the aggregation window, the indication information used to indicate the first indication information; or send, to the terminal device at another moment, the indication information used to indicate at least the first indication information. This is not limited in this embodiment of this application.

In a possible design, the sending, by the network device to the terminal device in a scheduled slot and/or dedicated slot in the aggregation window, indication information used to indicate the first indication information and the second indication information; and sending, by the network device to the terminal device in a slot outside the aggregation window, the indication information used to indicate the first indication information include: when an amount of indication information that is used to indicate first indication information specific to the entire aggregation window and that is sent by the network device is less than or equal to a preset value, sending, by the network device to the terminal device in the slot outside the aggregation window, the indication information used to indicate the first indication information specific to the entire aggregation window.

In this embodiment of this application, when a quantity of times for sending the first indication information specific to the entire aggregation window is less than the preset value, the network device sends, outside the aggregation window, the indication information used to indicate the first indication information specific to the entire aggregation window. In this way, the indication information used to indicate the first indication information is sent to the terminal device for a plurality of times, thereby improving reliability of sending the indication information used to indicate the first indication information.

In a possible design, the sending, by the network device to the terminal device in a slot outside the aggregation window, the indication information used to indicate the first indication information includes: sending, by the network device to the terminal device in a designated slot outside the aggregation window, the indication information used to indicate the first indication information specific to the entire aggregation window.

In this embodiment of this application, the network device may send, to the terminal device in the slot outside the aggregation window, for example, a slot within a range from the slot outside the aggregation window to an uplink slot corresponding to a component carrier, or in the designated slot outside the aggregation window, the indication information used to indicate the first indication information specific to the entire aggregation window. This is not limited in this embodiment of this application.

In a possible design, the designated slot in the aggregation window precedes a third slot and is separated from the third slot by (k−1) slots, and the third slot is a slot in which the terminal device sends uplink control information UCI to the network device, where k is specified in a protocol, or is obtained based on a configuration parameter configured by the network device for the terminal device.

In this embodiment of this application, k may be specified in the protocol, or may be configured by the network device. In this way, the network device can accurately determine, based on a value of k, a slot in which the first indication information is sent to the terminal device.

In a possible design, the first indication information is a sum of information amounts corresponding to a data channel and/or information amounts corresponding to a control channel that are in a reference slot in the aggregation window and at least one first slot; the first indication information is a sum of information amounts corresponding to a data channel and/or information amounts corresponding to a control channel that are in a reference slot in the aggregation window and at least one first slot, and information amounts corresponding to a data channel and/or information amounts corresponding to a control channel that are in a reference slot outside the aggregation window and at least one first slot, or the first indication information is a sum of information amounts corresponding to a data channel and/or information amounts corresponding to a control channel that are in a reference slot within a designated slot range and at least one first slot. The designated slot range is from the start moment of the aggregation window to the designated slot or from a first designated slot of the designated slot to a second designated slot of the designated slot.

In this embodiment of this application, specific content included in indication information sent by the network device to the terminal device in different slots is different. The foregoing is merely several examples, and this is not limited in this embodiment of this application.

In this embodiment of this application, when the first indication information sent by the network device is the indication information specific to the aggregation window, the terminal device can determine the HARQ feedback information based on the indication information specific the aggregation window; or when the first indication information sent by the network device is indication information specific to a specific slot, the terminal device can determine the HARQ feedback information based on the indication information specific to the designated slot.

In a possible design, the network device sends the indication information to the terminal device by using DCI, where the DCI has a specific format or specific frequency domain information, to indicate to the terminal device that the DCI carries the first indication information; the network device sends the indication information to the terminal device by using a PDSCH, and uses DCI to indicate to the terminal device that the PDSCH carries the first indication information; or the network device sends the indication information to the terminal device by using DCI, where the indication information includes the first indication information and information about the aggregation window; or when the network device sends, to the terminal device in the scheduled slot and/or dedicated slot in the aggregation window, the indication information used to indicate the first indication information and/or the second indication information, the method further includes: repeatedly sending, by the network device in the aggregation window by using at least one of the plurality of component carriers, the indication information used to indicate the first indication information, and/or repeatedly sending, by using different slots of a component carrier to which a reference slot corresponds, the indication information used to indicate the first indication information.

In this embodiment of this application, the network device may send, in different manners, the indication information used to indicate the first indication information, and the foregoing is merely several examples.

In this embodiment of this application, when the network device sends, to the terminal device by using the DCI in the slot outside the aggregation window, the indication information used to indicate the first indication information, the terminal device determines, based on the specific format or the specific frequency domain information of the DCI, that the DCI carries the first indication information; when the network device sends, to the terminal device by using the PDSCH in the slot outside the aggregation window, the indication information used to indicate the first indication information, the terminal device determines, based on DCI sent by the network device, that the PDSCH carries the first indication information; or when the network device sends, by using the plurality of component carriers or different slots corresponding to a component carrier having a shortest slot length, the indication information used to indicate the first indication information, the terminal device determines, based on a plurality of pieces of received indication information used to indicate the first indication information, whether the received first indication information is the indication information specific to the entire aggregation window.

In a possible design, the information amount corresponding to the data channel is at least one of a transport block TB quantity, a code block group CBG quantity, a TB and CBG quantity, a downlink control information DCI amount corresponding to a physical downlink shared channel PDSCH, or a serving cell quantity corresponding to a physical downlink shared channel PDSCH; and the information amount corresponding to the control channel is at least one of a quantity of physical downlink control channels PDCCHs indicating downlink semi-persistent scheduling SPS release, a quantity of PDCCHs indicating downlink SPS activation, an amount of DCI that corresponds to a physical downlink control channel and that indicates downlink semi-persistent scheduling SPS release, or an amount of DCI indicating downlink SPS activation.

In this embodiment of this application, the information amount corresponding to the data channel and the information amount corresponding to the control channel may include different cases, and the foregoing is merely several examples. This is not limited in this embodiment of this application.

In a possible design, the reference slot is at least one of a slot having a shortest slot length among those of the plurality of component carriers; a slot having a longest slot length among those of the plurality of component carriers; and a slot designated among those of the plurality of carrier components, where the designated slot is specified in a protocol and is stored in the terminal device, or is configured by the network device for the terminal device.

In this embodiment of this application, the reference slot may include different cases, and the foregoing several cases are merely examples. In addition, when the terminal configures the plurality of reference slots, one of the plurality of reference slots may be selected depending on an actual situation.

In a possible design, when the reference slot is not the slot having the shortest slot length, the method further includes: predicting, by the network side device, a predicted quantity of TBs and/or CBGs sent in a subsequent slot of slot whose slot length is shorter than that of the reference slot and that is in the at least one first slot; and adding, by the network side device, the predicted quantity to the first indication information.

In this embodiment of this application, when the reference slot is not the slot having the shortest slot length, the network device predicts the predicted quantity of TBs and/or CBGs sent in the subsequent slot of the slot whose slot length is shorter than that of the reference slot and that is in the at least one first slot, thereby improving accuracy of calculating the first indication information, and further improving accuracy of feeding back the HARQ feedback information by the terminal device.

In a possible design, when the predicted quantity is less than an actual quantity of TBs and/or CBGs to be actually sent in the subsequent slot, the method further includes: sending, by the network device in a subsequent resource of the subsequent slot, the TBs and/or CBGs to be actually sent; and/or when the predicted quantity is greater than an actual quantity of TBs and/or CBGs to be actually sent in the subsequent slot, the method further includes: repeatedly sending, by the network device in the subsequent slot, TBs and/or CBGs that have been sent before the subsequent slot.

In this embodiment of this application, when the reference slot is not the slot having the shortest slot length, the network device determines, based on the predicted quantity and the actual quantity in the subsequent slot, data to be sent in the subsequent slot, thereby improving feedback accuracy of the terminal device.

According to a second aspect, an embodiment of this application provides a hybrid automatic repeat request HARQ feedback method. The method may be performed by a network device. The method includes: obtaining, by the network device, first indication information used to instruct a terminal device to feed back HARQ feedback information; and sending, by the network device to the terminal device in a scheduled slot and/or dedicated slot in an aggregation window, indication information used to indicate the first indication information, and sending, to the terminal device in a slot outside the aggregation window, the indication information used to indicate the first indication information.

The technical solution provided in this embodiment of this application can also be applicable to a single carrier case. The indication information used to indicate the first indication information is sent in the scheduled slot and/or dedicated slot in the aggregation window, and the first indication information includes a sum of information amounts corresponding to a data channel and/or information amounts corresponding to a control channel that are in each slot in the aggregation window and a slot preceding each slot; and the indication information used to indicate first indication information is sent to the terminal device in the slot outside the aggregation window, and the first indication information is a sum of information amounts corresponding to the data channel and/or information amounts corresponding to the control channel that are in all the slots in the aggregation window. In other words, the indication information used to indicate the first indication information is sent to the terminal device for a plurality of times, thereby improving reliability of sending the first indication information by the network device.

According to a third aspect, an embodiment of this application provides a hybrid automatic repeat request HARQ feedback method. The method may be performed by a terminal device. The method includes: receiving, by the terminal device, a transport block sent by a network device, where the transport block includes at least one code block group CBG, and the CBG is a basic unit of sending the transport block; and detecting, by the terminal device, downlink control information corresponding to the transport block, and sending HARQ feedback information to the network device based on a detection result. When the downlink control information is lost, the HARQ feedback information is discontinuous transmission DTX corresponding to the transport block.

In this embodiment of this application, when the downlink control information corresponding to the transport block is not lost, the terminal device feeds back feedback information corresponding to the CBG; or when the downlink control information corresponding to the transport block is lost, the terminal device feeds back feedback information corresponding to the TB, to reduce signaling overheads while ensuring feedback accuracy, thereby saving system resources.

According to a fourth aspect, an embodiment of this application provides a hybrid automatic repeat request HARQ feedback apparatus. The apparatus may be a network device, or may be a chip in a network device. The apparatus may include a processing unit and a transceiver unit. When the apparatus is a network device, the processing unit may be a processor, and the transceiver unit may be a transceiver. The network device may further include a storage unit, and the storage unit may be a memory. The storage unit is configured to store an instruction, and the processing unit executes the instruction stored in the storage unit, so that the network device performs a corresponding function in the first aspect. When the apparatus is a chip in a network device, the processing unit may be a processor, and the transceiver unit may be an input/output interface, a pin, a circuit, or the like. The processing unit executes an instruction stored in a storage unit, so that the network device performs a corresponding function in the first aspect. The storage unit may be a storage unit (for example, a register or a cache) inside the chip, or may be a storage unit (for example, a read only memory or a random access memory), outside the chip, in the network device.

According to a fifth aspect, an embodiment of this application provides a hybrid automatic repeat request HARQ feedback apparatus. The apparatus may be a terminal device, or may be a chip in a terminal device. The apparatus may include a processing unit and a transceiver unit. When the apparatus is a terminal device, the processing unit may be a processor, and the transceiver unit may be a transceiver. The terminal device may further include a storage unit, and the storage unit may be a memory. The storage unit is configured to store an instruction, and the processing unit executes the instruction stored in the storage unit, so that the terminal device performs a corresponding function in the first aspect. When the apparatus is a chip in a terminal device, the processing unit may be a processor, and the transceiver unit may be an input/output interface, a pin, a circuit, or the like. The processing unit executes an instruction stored in a storage unit, so that the terminal device performs a corresponding function in the first aspect. The storage unit may be a storage unit (for example, a register or a cache) inside the chip, or may be a storage unit (for example, a read only memory or a random access memory), outside the chip, in the terminal device.

According to a sixth aspect, an embodiment of this application provides a hybrid automatic repeat request HARQ feedback apparatus. The apparatus may be a network device, or may be a chip in a network device. The apparatus may include a processing unit and a transceiver unit. When the apparatus is a network device, the processing unit may be a processor, and the transceiver unit may be a transceiver. The network device may further include a storage unit, and the storage unit may be a memory. The storage unit is configured to store an instruction, and the processing unit executes the instruction stored in the storage unit, so that the network device performs a corresponding function in the second aspect. When the apparatus is a chip in a network device, the processing unit may be a processor, and the transceiver unit may be an input/output interface, a pin, a circuit, or the like. The processing unit executes an instruction stored in a storage unit, so that the network device performs a corresponding function in the second aspect. The storage unit may be a storage unit (for example, a register or a cache) inside the chip, or may be a storage unit (for example, a read only memory or a random access memory), outside the chip, in the network device.

According to a seventh aspect, an embodiment of this application provides a hybrid automatic repeat request HARQ feedback apparatus. The apparatus may be a terminal device, or may be a chip in a terminal device. The apparatus may include a processing unit and a transceiver unit. When the apparatus is a terminal device, the processing unit may be a processor, and the transceiver unit may be a transceiver. The terminal device may further include a storage unit, and the storage unit may be a memory. The storage unit is configured to store an instruction, and the processing unit executes the instruction stored in the storage unit, so that the terminal device performs a corresponding function in the third aspect. When the apparatus is a chip in a terminal device, the processing unit may be a processor, and the transceiver unit may be an input/output interface, a pin, a circuit, or the like. The processing unit executes an instruction stored in a storage unit, so that the terminal device performs a corresponding function in the third aspect. The storage unit may be a storage unit (for example, a register or a cache) inside the chip, or may be a storage unit (for example, a read only memory or a random access memory), outside the chip, in the terminal device.

According to a seventh aspect, an embodiment of this application further provides a communications system. The system includes the network device according to the fourth aspect and the terminal device according to the fifth aspect.

According to an eighth aspect, an embodiment of this application provides a computer storage medium. The computer storage medium is configured to store a computer software instruction used to perform a function in any one of the first aspect or the designs of the first aspect, the second aspect, and the third aspect, and includes a program designed for performing the method in any one of the first aspect or the designs of the first aspect, the second aspect, and the third aspect.

According to a ninth aspect, an embodiment of this application provides a chip system. The chip system includes a processor, configured to support a terminal device or a network device to implement the method according to any one of the foregoing aspects, for example, generate or process data and/or information in the method. In a possible design, the chip system further includes a memory, and the memory is configured to store a program instruction and data that are necessary for the terminal device or the network device. The chip system may include a chip, or may include a chip and another discrete device.

BRIEF DESCRIPTION OF DRAWINGS

FIG. 1 is a schematic diagram of different component carriers having a same slot length in the prior art;

FIG. 2 is a schematic diagram of different component carriers having different slot lengths;

DESCRIPTION OF EMBODIMENTS

Figure 3:
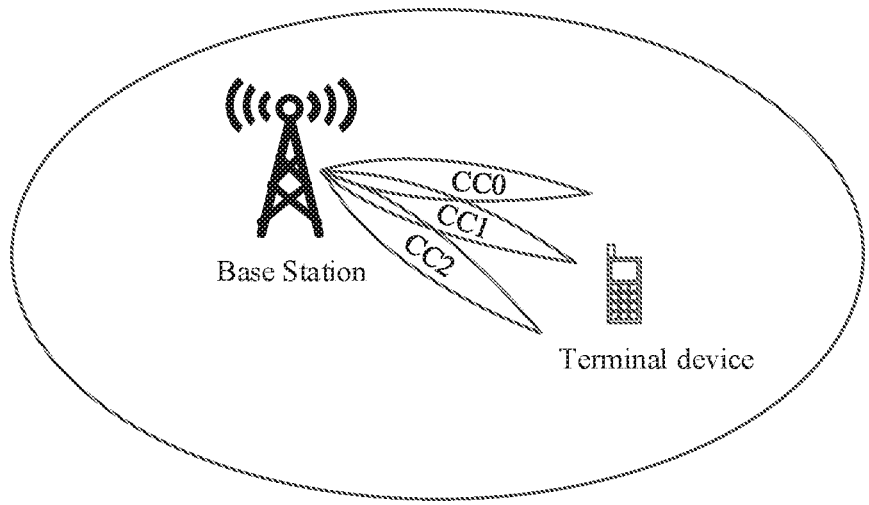
FIG. 3 shows an application scenario according to an embodiment of this application.

To make objectives, technical solutions, and advantages of this application clearer, the following further describes this application in detail with reference to the accompanying drawings.

The technical solutions described in the embodiments of this application may be applied to a 5th generation mobile communications technology (5G) and further to a next-generation mobile communications system.

The following explains some terms in the embodiments of this application, to help a person skilled in the art have a better understanding.

(1) Network device: The network device, for example, a base station (for example, an access point), may be a device that is in an access network and that communicates with a wireless terminal device over an air interface by using one or more sectors. The base station may be configured to perform mutual conversion between a received over-the-air frame and an IP packet and serve as a router between a terminal device and a rest part of the access network. The rest part of the access network may include an IP network. The base station may further coordinate attribute management of the air interface. For example, the base station may include an evolved NodeB (NodeB or eNB or e-NodeB) in a long term evolution (LTE) system or an LTE-advanced (LTE-A) system, or may include a next generation NodeB (gNB) in a 5G system. This is not limited in the embodiments of this application.

(2) Terminal device: The terminal device includes a device that provides a user with voice and/or data connectivity, for example, a handheld device with a wireless connection function, or a processing device connected to a wireless modem. The terminal device may communicate with a core network by using a radio access network (RAN), and exchange voice and/or data with the RAN. The terminal device may include user equipment (UE), a wireless terminal device, a mobile terminal device, a subscriber unit, and a subscriber station, a mobile station, a mobile station, a remote station, an access point (AP), a remote terminal device, an access terminal device, a user terminal device, a user agent, a user device, and the like. For example, the terminal device may include a mobile phone (referred to as a "cellular" phone), a computer with a mobile terminal device, a portable, pocket-sized, handheld, computer embedded, or in-vehicle mobile apparatus, a smart wearable device, and the like. For example, the terminal device may include a personal communications service (PCS) phone, a cordless telephone set, a session initiation protocol (SIP) phone, a wireless local loop (WLL) station, a personal digital assistant (PDA), a smartwatch, a smart helmet, smart glasses, a smart band, and other devices. The terminal device further includes a restricted device, for example, a device with comparatively low power consumption, a device with a limited storage capability, or a device with a limited computing capability. For example, the terminal device includes an information sensing device such as a barcode, radio frequency identification (RFID), a sensor, a global positioning system (GPS), or a laser scanner.

(3) CC: A plurality of CCs are aggregated to obtain a larger operating bandwidth. This is referred to as carrier aggregation (CA). In this way, downlinks and uplinks in a communications system are formed, to support a higher transmission rate. For example, five 20-MHz CCs may be aggregated to support a bandwidth of 10) megahertz (MHz). Herein, each CC is referred to as a cell (Cell). For one UE, a base station may be configured to operate in a plurality of CCs. One of the plurality of CCs is a primary CC (PCell), and other CCs are referred to as secondary CCs (SCell). In the embodiments of this application, the CC may alternatively be a carrier, a subcarrier of a carrier, or a bandwidth part (BWP).

(4) Terms "system" and "network" in the embodiments of this application may be used interchangeably. "Plurality" means two or more. In view of this, "plurality" may also be understood as "at least two" in the embodiments of this application. "And/or" describes an association relationship between associated objects and indicates that three relationships may exist. For example, A and/or B may indicate the following three cases: Only A exists, both A and B exist, and only B exists. In addition, the character "/", unless otherwise specified, generally indicates an "or" relationship between the associated objects.

Because a HARQ timing relationship may be configured dynamically. ACK/NACK information corresponding to PDSCHs of different component carriers at different moments is sent by using one PUCCH. In this case, to enable a network device to identify feedback information from a terminal device, at least a bit quantity fed back by the terminal device needs to be determined between the network device and the terminal device.

In an example, the network device can calculate a quantity of TBs that can be transmitted in a current slot of an invoked CC and a quantity of TBs transmitted in the current slot of each CC. Therefore, the network device can calculate a TB quantity accumulated in the current slot and a slot preceding the current slot that are of all CCs, where the TB quantity is denoted as first indication information, and a TB quantity accumulated in the current slot and the slot preceding the current slot that are of CCs until a current CC, where the TB quantity is denoted as second indication information. Then, the network device adds the first indication information and the second indication information to downlink control information (DCI) sent to the terminal device, so that after receiving the DCI, the terminal device determines, based on the first indication information and the second indication information in the DCI information, a feedback sequence and a feedback bit quantity of the ACK/NACK. The current slot is a slot in which the network device sends a TB to the terminal, and a current carrier is a component carrier scheduled by the network device in the current slot.

It is assumed that the terminal device activates eight CCs, denoted as a CC0 to a CC7; each CC includes four slots, denoted as a slot n to a slot (n+3) (namely, a Slot n to a Slot (n+3)); and one TB is transmitted in each slot. Referring to FIG. 1, a position (1/3) corresponding to a slot n of the CC0 indicates that: Three TBs can be transmitted in slots n of the CC0 to the CC7, and one TB is transmitted in the slot n of the CC0; a position (2/3) corresponding to a slot n of the CC2 indicates that: Three TBs can be transmitted in the slots n of the CC0 to the CC7, and there are a total of two TBs obtained by adding the one TB transmitted in the slot n of the CC0 up one TB transmitted in the slot n of the CC1; a position (3/3) corresponding to a slot n of the CC5 indicates that: Three TBs can be transmitted in the slots n of the CC0 to the CC7, and there are a total of three TBs obtained by adding one TB transmitted in the slot n of the CC5 up the two TBs transmitted in the slots of the CC0 and CC2; a position (4/6) corresponding to a slot (n+1) of the CC0 indicates that: There are a total of six TBs obtained by adding three TBs that can be transmitted in slots (n+1) of the CC0 to the CC7 up the three TBs transmitted in the slots n of the CC0 to the CC7, and there are a total of four TBs obtained by adding one TB transmitted in the slot (n+1) of the CC0 up the three TBs transmitted in the slots n of the CC0, the CC2, and the CC5. The rest may be deduced by analogy, and details are not described herein.

The network device sends downlink control information (DCI) in same slots of different component carriers. For example, the network device sends the DCI to the CC0 to the CC7 by using the first one to three orthogonal frequency division multiplexing (OFDM) symbols of the slots n corresponding to the different component carriers, where the DCI is denoted as DCI0, DCI2, and DCI5. In this way, after receiving the DCI in the slots n, the terminal device can determine that the network device transmits a total of three TBs in the slots n: one TB in the CC0, one TB in the CC2, one TB in the CC5. Therefore, the terminal device can determine a feedback sequence and a total bit quantity for feeding back HARQ feedback information.

The foregoing technical solution is specific to CCs having a same slot length. Still referring to FIG. 1, each of the CC0 to the CC7 shown in FIG. 1 has a same slot length, and different CCs also have same slot lengths. However, to meet different service requirements in an NR system, a plurality of component carriers may have different slot lengths. Referring to FIG. 2, a terminal device corresponds to n component carriers, denoted as a CC0 to a CCn. The CC0 and the CC have a same slot length, and the CC2 and the CCn each have a slot length different from the slot length of the CC0 or the CC1. In this case, the HARQ feedback solution in the prior art specific to the same slot length is no longer applicable to a similar scenario in the NR system in which component carriers have different slot lengths.

In view of this, the embodiments of this application provide a hybrid automatic repeat request HARQ feedback method. When at least two of a plurality of component carriers have different slot lengths, a network device obtains first indication information based on information amounts corresponding to a data channel and/or information amounts corresponding to a control channel that are in a reference slot and at least one first slot having a same start moment as the reference slot, so that the terminal device can determine, based on the first indication information, a bit quantity for feeding back HARQ feedback information. In this way, the technical solutions provided in the embodiments of this application are applicable to a network similar to a 5G system in which different component carriers have different slot lengths.

FIG. 3 shows an application scenario according to an embodiment of this application. In FIG. 3, a base station and a terminal device located in a coverage area of the base station are included. The base station allocates a plurality of cells to the terminal device. Each of the plurality of cells corresponds to one CC. For example, there are three cells: a C0, a C1, and a C2; and CCs corresponding to these three cells are a CC0, a CC1, and a CC2, respectively.

The base station sends a transport block TB to the terminal device by using a PDSCH, and the TB may be sent by using a plurality of CCs. The terminal device receives the TB sent by the base station by using the plurality of CCs, and feeds back ACK/NACK information corresponding to the TB to the base station.

With reference to the accompanying drawings, the following describes the technical solutions provided in the embodiments of this application. That the technical solutions provided in this application are applied to the application scenario shown in FIG. 3 and a network device is a base station is used as an example in the following description process.

Figure 4:
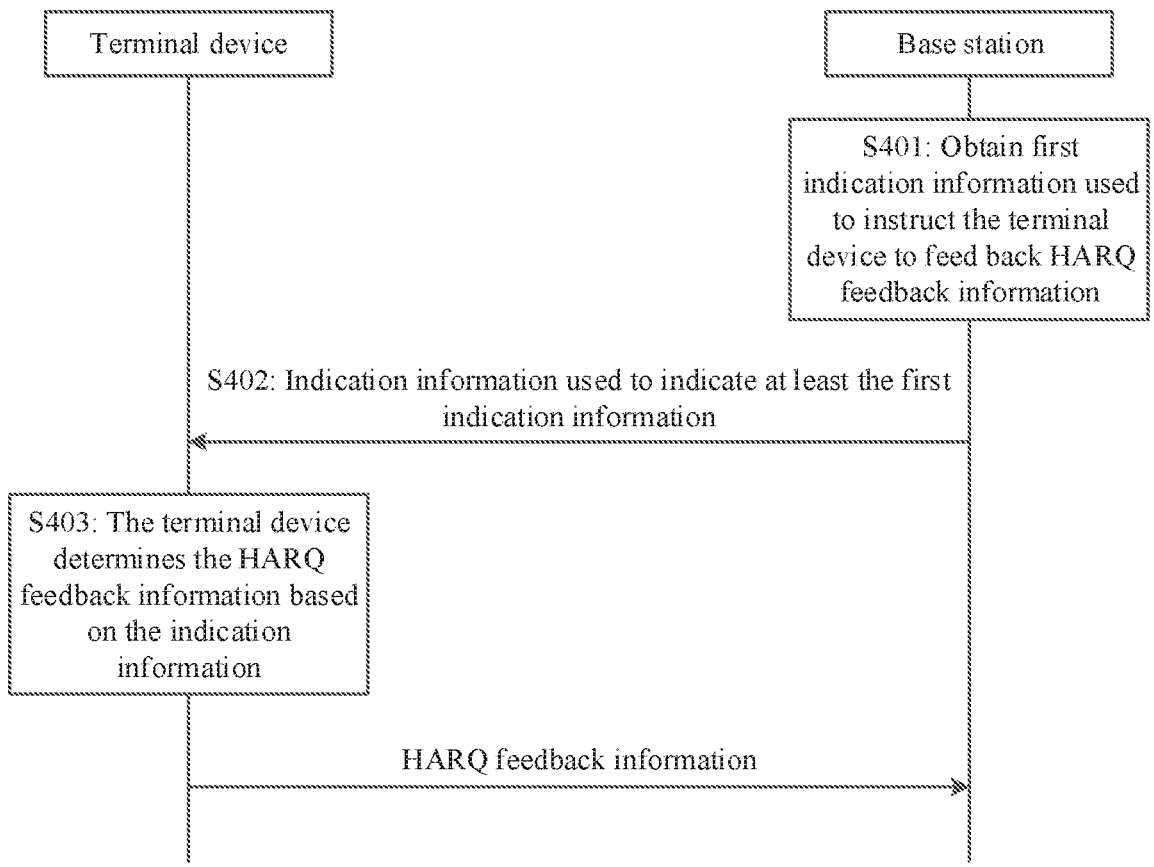
FIG. 4 is a flowchart of a hybrid automatic repeat request HARQ feedback method according to an embodiment of this application.

Referring to FIG. 4, an embodiment of this application provides a hybrid automatic repeat request HARQ feedback method. A process of the method is described as follows.

S401: A base station obtains first indication information used to instruct a terminal device to feed back HARQ feedback information, where the first indication information is obtained based on information amounts corresponding to a data channel and/or information amounts corresponding to a control channel that are in a reference slot and at least one first slot, the reference slot and the at least one first slot each correspond to a different component carrier of a plurality of component carriers that are scheduled by the terminal or in which the terminal is scheduled, and the reference slot and the at least one first slot have a same start moment, and at least two of the plurality of component carriers have different slot lengths.

The hybrid automatic repeat request HARQ feedback method provided in this embodiment of this application is applicable to either a downlink feedback or an uplink feedback. To be specific, the downlink feedback is a feedback from the terminal device specific to information sent by the base station, and the uplink feedback is a feedback from the base station specific to information sent by the terminal device. The downlink feedback is used as an example in the following descriptions.

Figure 5:
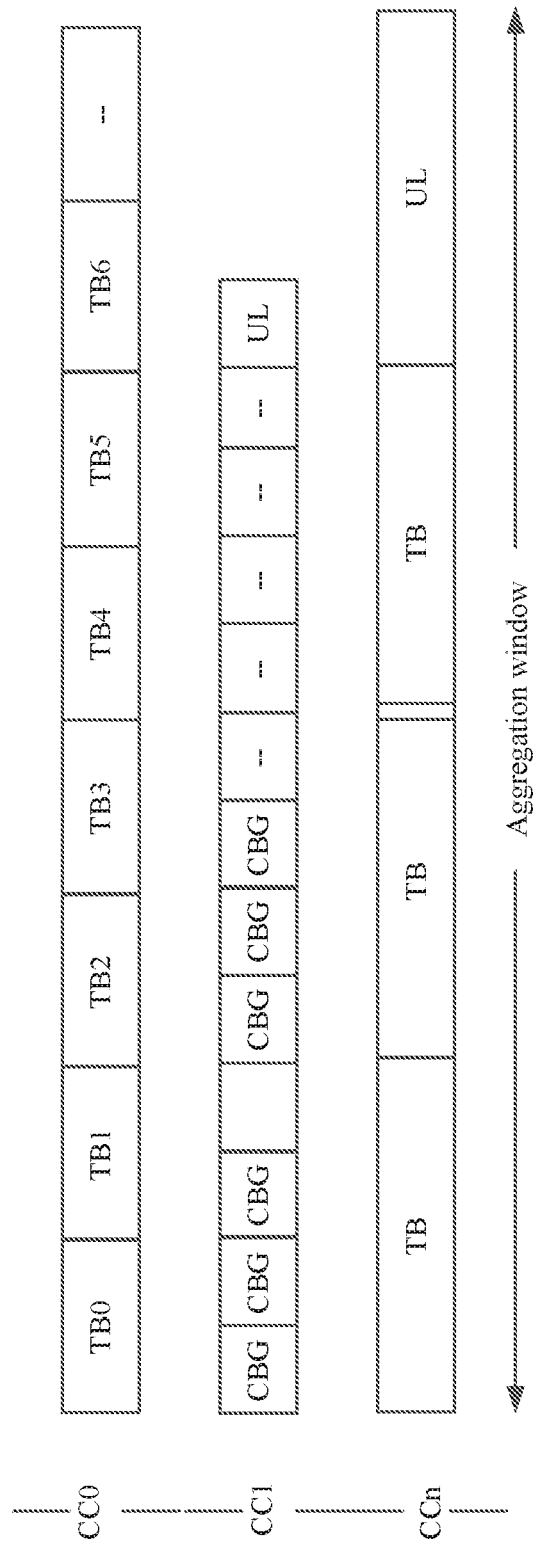
FIG. 5 is a schematic diagram of a reference slot according to an embodiment of this application.

Referring to FIG. 5, component carriers serving the terminal device may also be scheduled or activated component carriers, denoted as a CC0 to a CCn; and each component carrier includes a different quantity of slots. In FIG. 5, a set of all slots that are of the CC0 to the CCn and that are within a range from the 1 TB to UL is referred to as an aggregation window, and HARQ feedback information in all the slots in the aggregation window is fed back by using one uplink control channel or one piece of uplink control information. Herein, the aggregation window may be aggregation in frequency domain, aggregation in time domain, or aggregation in frequency domain and time domain. The frequency domain may refer to a plurality of CCs or a plurality of BWPs. In addition, a name of the "aggregation window" is not limited herein, or may be a "binding window".

Still referring to FIG. 5, the CC0, the CC1, and the CCn shown in FIG. 5 each have a different slot length. In this embodiment of this application, that component carriers have different slot lengths may also be understood as that the two component carriers have different OFDM parameter sets, namely, different OFDM numerologies, or different subcarrier spacings.

When the CC0, the CC1, and the CCn each have a different slot length, a reference slot needs to be determined before the first indication information and second indication information are determined.

In this embodiment of this application, the reference slot may be a slot having a shortest slot length among those of the plurality of component carriers, for example, a slot of the CC shown in FIG. 5; the reference slot may be a slot having a longest slot length among those of the plurality of component carriers, for example, a slot of the CCn shown in FIG. 5; or the reference slot may be a slot specified in a protocol or a slot that is designated among those of the plurality of carrier components and that is configured by the base station for the terminal device, for example, a slot of the CC0 shown in FIG. 5. The base station may configure the reference slot through radio resource control (RRC) or by using a physical downlink control channel; or an RRC layer configures a parameter set, and a media access control (MAC) layer or a physical layer configures, for the terminal device, a reference slot from the parameter set. In a specific implementation process, the base station may configure only one reference slot or a plurality of reference slots, for example, the slot having a shortest slot length among those of the plurality of component carriers, the slot having the longest slot length among those of the plurality of component carriers, or the slot specified in the protocol or the slot configured by the base station for the terminal device. When the base station configures a plurality of different reference slots, one of the plurality of different reference slots may be selected for use depending on an actual situation.

The slot of the CC1 is used as a reference slot, and there are a plurality of reference slots accumulated from a start moment of the aggregation window, for example, 15 shown in FIG. 5. When there are the plurality of reference slots, the first indication information is the information amounts corresponding to the data channel and/or the information amounts corresponding to the control channel that are in the reference slot and the at least one first slot, and information amounts corresponding to the data channel and/or information amounts corresponding to the control channel that are in slots, preceding the reference slot, corresponding to the plurality of component carriers.

In this embodiment of this application, the base station further needs to obtain second indication information used to instruct the terminal device to feed back the HARQ feedback information. The base station may obtain, when or before or after obtaining the first indication information, the second indication information used to instruct the terminal device to feed back the HARQ feedback information. A sequence of obtaining the first indication information and the second indication information is not limited herein. The second indication information is obtained from information amounts corresponding to the data channel and/or information amounts corresponding to the control channel that are accumulated in a frequency-first manner from a specific moment of the aggregation window and the $1^{st}$ component carrier of the plurality of component carriers to a current component carrier to which a second slot corresponds. The second slot is obtained from the reference slot and the at least one first slot. For example, the specific moment herein is the start moment of the aggregation window.

In this embodiment of this application, an information amount on a data channel is at least one of a transport block TB quantity, a code block group CBG quantity, a TB and CBG quantity, a downlink control information DCI amount corresponding to a physical downlink shared channel PDSCH, or a serving cell quantity corresponding to a physical downlink shared channel PDSCH; and an information amount on a control channel is at least one of a quantity of physical downlink control channels PDCCH indicating downlink semi-persistent scheduling SPS release, a quantity of PDCCHs indicating downlink SPS activation, an amount of DCI that corresponds to a physical downlink control channel and that indicates downlink SPS release, or an amount of DCI indicating downlink SPS activation.

When the base station sends different information, the first indication information also includes different content. The following separately provides descriptions.

(1) When the base station sends data information by using a data channel, the first indication information is obtained based on TB quantities in the reference slot and the at least one first slot, the first indication information is obtained based on CBG quantities in the reference slot and the at least one first slot, or the first indication information is obtained based on TB and CBG quantities in the reference slot and the at least one first slot.

(2) When the base station sends control information by using a control channel, the first indication information is obtained based on quantities of PDCCHs indicating downlink SPS release, quantities of PDCCHs indicating downlink SPS activation, amounts of DCI that corresponds to a physical downlink control channel and that indicates downlink SPS release, or amounts of DCI indicating downlink SPS activation that are in the reference slot and the at least one first slot.

(3) When the base station sends data information by using a data channel and sends control information by using a control channel, the first indication information is obtained based on quantities of TBs, CBGs, physical downlink control channels indicating downlink SPS release, and PDCCHs indicating downlink SPS activation that are in the reference slot and the at least one first slot; or the first indication information is obtained based on DCI amounts corresponding to a PDSCH and quantities of PDCCHs indicating downlink SPS release or downlink SPS activation that are in the reference slot and the at least one first slot.

The following describes a process of obtaining the first indication information and the second indication information by using an example in which the information amount corresponding to the data channel is the TB and CBG quantity, and the reference slot is or is not the slot having the shortest slot length among those of the plurality of component carriers.

Figure 6:
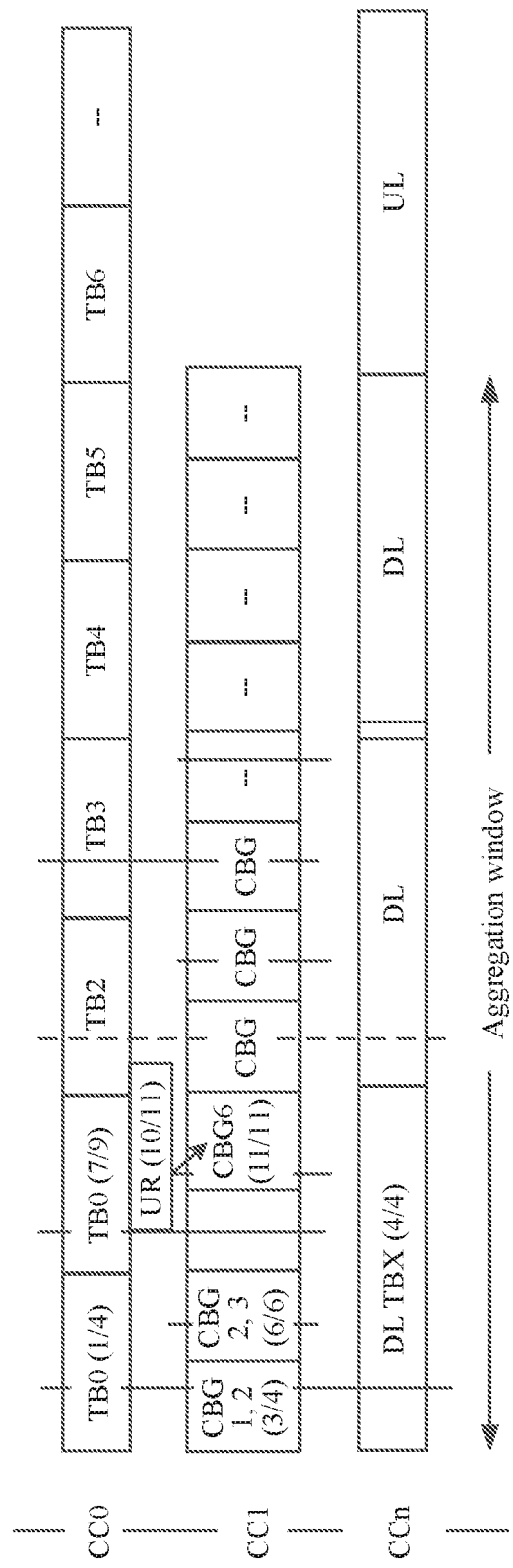
FIG. 6 is a schematic diagram of obtaining first indication information when a reference slot is a slot having a shortest slot length according to an embodiment of this application.

Referring to FIG. 6, the terminal device activates component carriers CC0 to CCn. The CC0, the CC1, and the CCn have different slot lengths, and the CC1 has a shortest slot length. In this case, a slot of the CC is used as a reference slot. It is assumed that one TB is transmitted in a slot of the CC0, two CBGs are transmitted in a slot of the CC1, and one TB is transmitted in a slot of the CCn.

In this embodiment of this application, in the process of obtaining the first indication information and the second indication information, there may be at least one first slot having a same start moment as the reference slot, or there may be no at least one first slot having a same start moment as the reference slot. When there is no at least one first slot having a same start moment as the reference slot, an information amount corresponding to a data channel and/or an information amount corresponding to a control channel that are/is in the at least one first slot is 0. For example, when the $1^{st}$ slot of the CC1 is used as a reference slot, at least one first slot having a same start moment as the $1^{st}$ slot of the CC1 is the $1^{st}$ slot of the CC0 and the $1^{st}$ slot of the CCn, while when the $2^{nd}$ slot of the CC1 is used as a reference slot, there is no at least one first slot having a same start moment as the $2^{nd}$ slot of the CC1.

Correspondingly, when there are a plurality of reference slots, the first indication information is the information amounts corresponding to the data channel and/or the information amounts corresponding to the control channel that are in the reference slot and the at least one first slot, and information amounts corresponding to the data channel and/or information amounts corresponding to the control channel that are in slots, preceding the reference slot, corresponding to the plurality of component carriers. Alternatively, when there are a plurality of reference slots accumulated from the start moment of the aggregation window, the first indication information is information amounts corresponding to the data channel and/or information amounts corresponding to the control channel that are in each of the reference slots and at least one corresponding first slot. For example, there are three reference slots accumulated from the start moment of the aggregation window. In this case, information amounts corresponding to a control channel and/or information amounts corresponding to a control channel that are in the $1^{st}$ reference slot and at least one first slot corresponding to the $1^{st}$ reference slot, information amounts corresponding to a control channel and/or information amounts corresponding to a control channel that are in the $2^{nd}$ reference slot and at least one first slot corresponding to the $2^{nd}$ reference slot, and information amounts corresponding to a control channel and/or information amounts corresponding to a control channel that are in the $3^{rd}$ reference slot and at least one first slot corresponding to the $3^{rd}$ reference slot are added up.

First, the reference slot is the slot having the shortest slot length among those of the plurality of component carriers.

The first indication information is a sum of TB and CBG quantities in the reference slot and at least one first reference slot, and a TB and CBG quantity accumulated in the slots preceding the reference slot. For example, the $1^{st}$ slot of the CC1 is used as a reference slot, and at least one first slot having a same start moment as the $1^{st}$ slot of the CC1 is the $1^{st}$ slot of the CC0 and the 1st slot of the CCn. In this case, corresponding first indication information is a TB quantity 1 in the $1^{st}$ slot of the CC0 plus a CBG quantity 2 in the $1^{st}$ slot of the CC1 plus a TB quantity 1 in the $1^{st}$ slot of the CCn, 4 in total.

For the $2^{nd}$ slot of the CC1, the $2^{nd}$ slot of the CC1 is used as a reference slot, and at least one first slot having a same start moment as the $2^{nd}$ slot of the CC is the $1^{st}$ slot of the CC0 and the $1^{st}$ slot of the CCn. Because the TB quantity in the $1^{st}$ slot of the CC0 and the CBG quantity in the $1^{st}$ slot of the CCn have been counted in the $1^{st}$ slot of the CC1, first indication information corresponding to the $2^{nd}$ slot of the CC1 is a CBG quantity 2 in the $2^{nd}$ slot of the CC1 plus the TB and CBG quantity 4 accumulated in the $1^{st}$ slot of the CC1, 6 in total.

According to the foregoing calculation method, the base station can obtain first indication information corresponding to each slot of the CC1. Details are not described herein.

The second indication information is obtained from TB and CBG quantities that are accumulated in a frequency-first manner from the start moment of the aggregation window and the $1^{st}$ component carrier of the plurality of component carriers to the current component carrier to which the second slot corresponds. Herein, the $1^{st}$ component carrier may be a component carrier having a smallest index value, and the second slot is a slot of the CC1, or a slot that is of the CC0 or the CCn and that has a same start moment as a slot of the CC1. For example, the $1^{st}$ slot of the CC1 is still used as a reference slot, and at least one first slot having a same start moment as the $1^{st}$ slot of the CC1 is the $1^{st}$ slot of the CC0 and the $1^{st}$ slot of the CCn. In this case, the second indication information is the TB quantity 1 in the $1^{st}$ slot of the CC0 plus the CBG quantity 2 in the $1^{st}$ slot of the CC1 plus the TB quantity 1 in the $1^{st}$ slot of the CC0, 3 in total, and the TB quantity 1 in the $1^{st}$ slot of the CCn plus the TB quantity 1 in the $1^{st}$ slot of the CC1 plus the CBG quantity 2 in the $1^{st}$ slot of the CC1, 4 in total.

For the $2^{nd}$ slot of the CC1, the $2^{nd}$ slot of the CC1 is used as a reference slot, and at least one first slot having a same start moment as the $2^{nd}$ slot of the CC1 is the $1^{st}$ slot of the CC0 and the $1^{st}$ slot of the CCn. Because the TB quantity in the $1^{st}$ slot of the CC0 and the CBG quantity in the $1^{st}$ slot of the CCn have been counted in the $1^{st}$ slot of the CC1, corresponding second indication information in the $2^{nd}$ slot of the CC1 is a CBG quantity 2 in the $2^{nd}$ slot of the CC plus the TB and CBG quantity 4 accumulated in the $1^{st}$ slot, 6 in total.

According to the foregoing calculation method, the base station can obtain second indication information corresponding to each slot of the CC1. Details are not described herein.

Still referring to FIG. 6, in the process of obtaining the first indication information and the second indication information by the base station, when there is a CBG or a TB that is in a reference slot and that corresponds to an ultra-reliable low-latency communication (URLLC) service, a CBG quantity or a TB quantity corresponding to the URLLC service is accumulated separately or accumulated together with a CBG quantity or a TB quantity in the reference slot.

In an example, the $4^{th}$ slot of the CC1 is used. When the URLLC service arrives, and the base station cannot determine a quantity of CBGs that need to be scheduled in the $4^{th}$ slot of the CC1, the CBG quantity corresponding to the URLLC service is counted separately. First indication information corresponding to a moment at which the URLLC service arrives is a CBG quantity 1 corresponding to the URLLC service plus a TB and CBG quantity 9 accumulated in a slot preceding the $4^{st}$ slot, 10 in total; and second indication information is the CBG quantity corresponding to the URLLC service plus the TB and CBG quantity 9 accumulated in the slot preceding the $4^{th}$ slot, 10 in total.

In another example, the $4^{th}$ slot of the CC is still used. When the URLLC service arrives, and the base station can determine a quantity of CBGs that need to be scheduled in the $4^{st}$ slot of the CC1, the CBG quantity corresponding to the URLLC service and a CBG quantity in the $4^{th}$ slot are accumulated together. The first indication information is the CBG quantity 1 corresponding to the URLLC service plus the CBG quantity 2 in the $4^{th}$ slot of the CC1 plus a TB and CBG quantity 9 accumulated in a slot preceding the $4^{th}$ slot, 11 in total, and the second indication information is the CBG quantity corresponding to the URLLC service plus the TB and CBG quantity 9 accumulated in the slot preceding the $4^{th}$ slot, 10 in total.

Second, the reference slot is not the slot having the shortest slot length.

When the reference slot is not the slot having the shortest slot length, the base station predicts a predicted quantity of TBs and/or CBGs sent in a subsequent slot of a slot whose slot length is shorter than that of the reference slot and that is in the at least one first slot, and the base station adds the predicted quantity to the first indication information.

Figure 7:
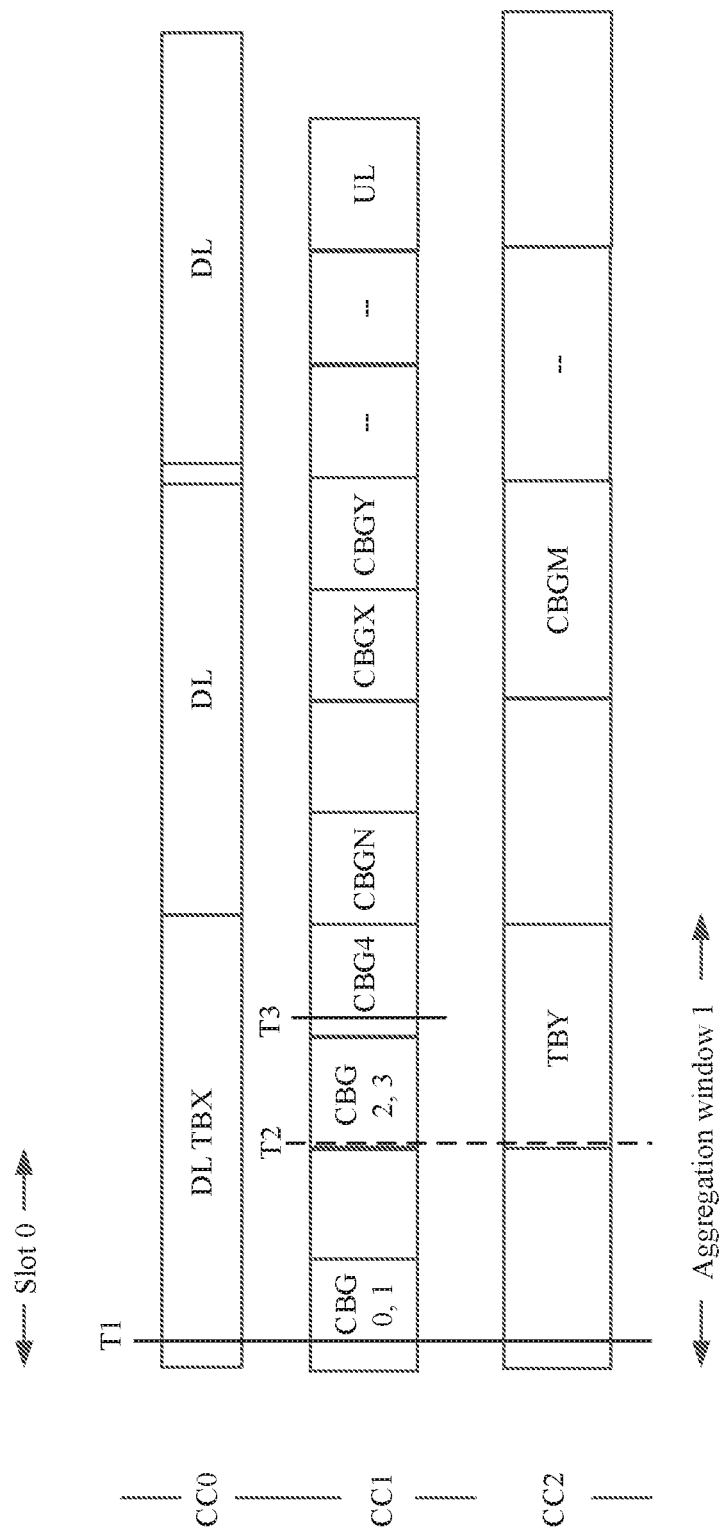
FIG. 7 is a schematic diagram of obtaining first indication information when a reference slot is not a slot having a shortest slot length according to an embodiment of this application.

Referring to FIG. 7, component carriers serving the terminal device are denoted as a CC0 to a CC2. The CC0 to the CC2 each have a different slot length, and a slot of the CC2 is used as a reference slot. Using positions marked by dashed lines shown in FIG. 7 as an example, indication information used to indicate the first indication information needs to be sent in the positions marked by the dashed line.

The first indication information is a sum of TB and CBG quantities in the reference slot and at least one first slot, and a TB and CBG quantity accumulated in a slot preceding the reference slot, for example, 9. In this case, the base station further needs to predict a quantity of TBs or CBGs sent in the subsequent slot of the slot whose slot length is shorter than that of the reference slot and that is in the at least one first slot. The subsequent slot herein, that is, a next slot of the slot whose slot length is shorter than that of the reference slot and that is in the at least one slot, may be a shortest slot, or may be a slot between the shortest slot and the reference slot, for example, a next slot of a slot that is of the CC1 and that is in the positions marked by the dashed lines shown in FIG. 7. Using a quantity 5 of TBs or CBGs sent in the next slot that is of the CC1 and that is in the positions marked by the dashed lines shown in FIG. 7 as an example, a preset predicted quantity needs to be added to the first indication information, 14 in total.

In a specific implementation process, after the quantity of TBs or CBGs sent in the subsequent slot is added to the first indication information, if the quantity of TBs or CBGs that need to be sent in the subsequent slot in a real scenario is less than the predicted quantity, for example, the actual quantity is 4 and is less than the predicted quantity 5, the base station repeatedly sends, in the subsequent slot, a TB or a CBG that has been sent in a slot preceding the subsequent slot. If the quantity of TBs or CBGs that need to be sent in the subsequent slot in a real scenario is greater than the predicted quantity, for example, the actual quantity is 7 and is greater than the predicted quantity 5, the TBs or CBGs that need to be sent in the subsequent slot is sent in a subsequent resource of the subsequent slot. The subsequent resource herein is a next slot of the subsequent slot.

S402: The base station sends, to the terminal device, indication information used to indicate at least the first indication information.

In this embodiment of this application, the first indication information may be sent implicitly or explicitly. For example, the first indication information is 4. When the first indication information is implicitly sent to the terminal device, the indication information may be a specific value, for example, A. When receiving the indication information A sent by the base station, the terminal device may determine the first indication information based on a correspondence between the indication information and the first indication information. When the first indication information is explicitly sent to the terminal device, the indication information may be the first indication information, namely, 4. A manner of sending the second indication information may be the same as the manner of sending the first indication information. Details are not described herein. That the first indication information is sent explicitly and the reference slot is the slot having the shortest slot length is used as an example in the following descriptions.

In this embodiment of this application, a manner of sending, by the base station to the terminal device, the indication information used to indicate at least the first indication information includes but is not limited to the following three manners. The following separately provides descriptions.

In a first manner, the base station sends, to the terminal device in a slot outside the aggregation window, the indication information used to indicate the first indication information.

Figure 8:
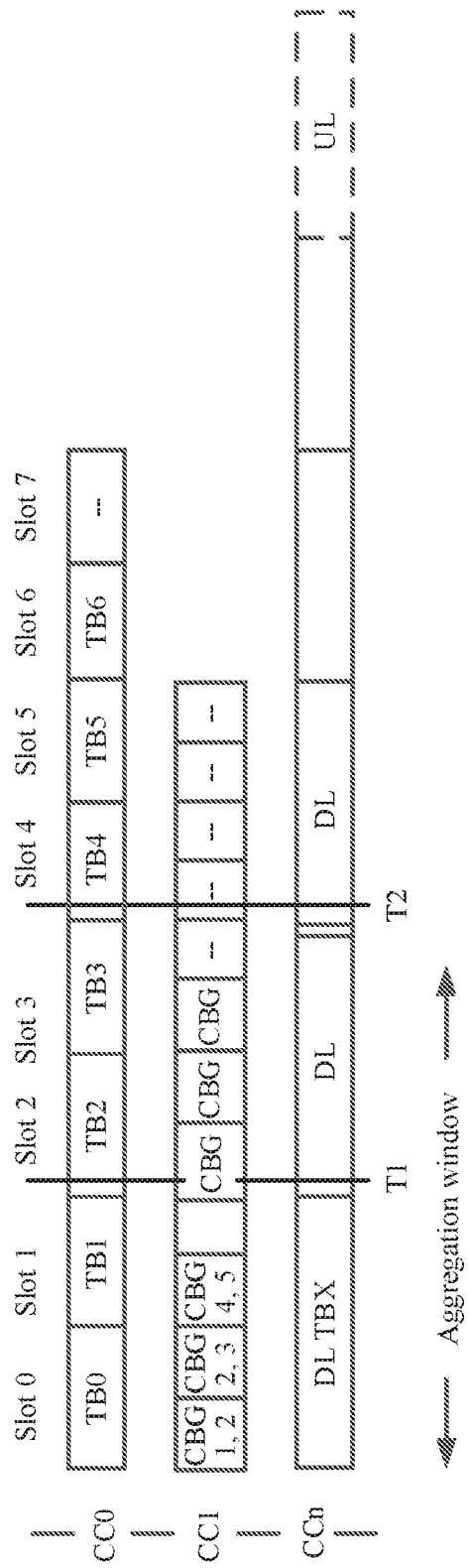
FIG. 8 is a schematic diagram of sending first indication information outside an aggregation window according to an embodiment of this application.

Referring to FIG. 8, component carriers serving the terminal device are denoted as a CC0 to a CCn, and each component carrier includes four slots, denoted as a slot 0 to a slot 3 (namely, a Slot 0 to a Slot 3). As shown in FIG. 8, slots corresponding to positions from the slot 0 to the slot 3 belong to one aggregation window, and HARQ feedback information in all the slots in the aggregation window is sent by using one uplink control channel or one piece of uplink control information.

In this embodiment of this application, the slot outside the aggregation window is usually a slot that is of a component carrier and that is outside the aggregation window and precedes an uplink slot. Certainly, the base station may alternatively send, in a designated slot outside the aggregation window, the indication information used to indicate the first indication information. The designated slot herein is stored in the terminal device, or is configured by the base station for the terminal device. The base station may configure the designated slot through radio resource control (RRC), by using a media access control element (MAC CE), or by using a physical downlink control channel; or an RRC layer configures a parameter set, and a media access control (MAC) layer or a physical layer configures, for the terminal device, a designated slot from the parameter set configured by the RRC.

In this embodiment of this application, the designated slot outside the aggregation window precedes a third slot and is separated from the third slot by (k−1) slots. The third slot is a slot in which the terminal device sends uplink control information UCI to the base station, k is specified in a protocol, or is obtained based on a configuration parameter configured by the base station for the terminal device.

Still referring to FIG. 8, a slot shown in dashed lines of the CCn shown in FIG. 8 is the slot in which the terminal device sends the uplink control information (UCI) to the base station, namely, the third slot. In this case, separating from the third slot by (k−1) slots is counting k slots backward from the third slot. For example, k=2, and the third slot is the $6^{th}$ slot of the CCn. In this case, the designated slot is obtained by counting two slots backward from the $6^{th}$ slot, namely, the $4^{th}$ slot of the CCn.

In this embodiment of this application, k is specified in the protocol and is stored in the terminal device, or is configured by the base station for the terminal device. The base station may configure k through radio resource control (RRC), by using a MAC CE, or by using a physical downlink control channel; or an RRC layer configures a parameter set, and a media access control (MAC) layer or a physical layer configures, for the terminal device, k from the parameter set configured by the RRC; or k is implicitly determined by using K1. For example, the terminal device obtains, in a slot n, a data packet corresponding to a PDSCH, and the terminal device feeds back corresponding HARQ feedback information at a moment K1 based on a processing capability of the terminal device. It should be noted herein that a processing capability requirement of the terminal device needs to be met when the base station sends the last DCI information used to indicate the first indication information. To be specific, a time domain position in which DCI indicating the first indication information in the aggregation window of the terminal device is sent is a position (n−kx) before a time domain position n in which a PUCCH is located, where kx≥K1. Herein, K1 may be expressed as a slot or an OFDM symbol.

Still referring to FIG. 8, the base station sends the first indication information to the terminal at a moment T2 shown in FIG. 8. Specific content included in the first indication information includes but is not limited to the following two cases. The following separately provides descriptions.

A. The first indication information is a sum of TB and CBG quantities in a reference slot in the aggregation window and at least one first slot.

In A, the first indication information is indication information specific to the entire aggregation window. In FIG. 8, the base station schedules component carriers CC0 and CC1, and sends one TB in each slot of the CC0 and sends two CBGs in each of the $1^{st}$ slot, the $2^{nd}$ slot, the $3^{rd}$ slot, the $5^{th}$ slot, the $6^{th}$ slot, and the $7^{th}$ slot of the CC1. Using the $1^{st}$ slot of the CC1 as a reference slot, a sum of TB and CBG quantities in at least one first slot having a same start moment as the reference slot is 3; using the $2^{nd}$ slot of the CC1 as a reference slot, a sum of TB and CBG quantities in at least one first slot having a same start moment as the reference slot is 2; using the $3^{rd}$ slot of the CC1 as a reference slot, a sum of TB and CBG quantities in at least one first slot having a same start moment as the reference slot is 3; using the $5^{th}$ slot of the CC1 as a reference slot, a sum of TB and CBG quantities in at least one first slot having a same start moment as the reference slot is 3; using the $6^{th}$ slot of the CC1 as a reference slot, a sum of TB and CBG quantities in at least one first slot having a same start moment as the reference slot is 2; and using the $7^{th}$ slot of the CC1 as a reference slot, a sum of TB and CBG quantities in at least one first slot having a same start moment as the reference slot is 3. In this case, a sum of TB and CBG quantities in the reference slots in the aggregation window and the at least one first slot is 3+2+3+3+2+3, 16 in total.

B. The first indication information is a TB and CBG quantity in a reference slot in the aggregation window and at least one first slot, and a TB and CBG quantity in a reference slot outside the aggregation window and at least one first slot.

In B, the first indication information is specific to the entire aggregation window and is the TB and CBG quantity in the reference slot outside the aggregation window and the at least one first slot. Still referring to FIG. 8, the base station schedules the component carriers CC0 and CC1, and sends one TB in each slot of the CC0 and sends two CBGs in each of the $1^{st}$ slot, the $2^{nd}$ slot, the $3^{st}$ slot, the $5^{th}$ slot, the $6^{th}$ slot, and the $7^{th}$ slot of the CC1. Using the $1^{st}$ slot of the CC1 as a reference slot, a sum of TB and CBG quantities in at least one first slot having a same start moment as the reference slot is 3; using the $2^{nd}$ slot of the CC1 as a reference slot, a sum of TB and CBG quantities in at least one first slot having a same start moment as the reference slot is 2; using the $3^{st}$ slot of the CC1 as a reference slot, a sum of TB and CBG quantities in at least one first slot having a same start moment as the reference slot is 3; using the $5^{th}$ slot of the CC1 as a reference slot, a sum of TB and CBG quantities in at least one first slot having a same start moment as the reference slot is 3; using the $6^{th}$ slot of the CC1 as a reference slot, a sum of TB and CBG quantities in at least one first slot having a same start moment as the reference slot is 2; and using the $7^{th}$ slot of the CC1 as a reference slot, a sum of TB and CBG quantities in at least one first slot having a same start moment as the reference slot is 3. In this case, a sum of TB and CBG quantities in the reference slots in the aggregation window and the at least one first slot is 3+2+3+3+2+3, 16 in total. In addition, using the $9^{th}$ slot that is of the CC1 and that is outside the aggregation window as a reference slot, a sum of TB and CBG quantities in at least one first slot having a same start moment as the reference slot is 3, 19 in total.

In B, the calculation manner is applicable to a case in which an uplink PUCCH feedback delay requirement is met and there is data scheduled in the slot outside the aggregation window, namely, the $9^{th}$ slot of the CC1. Further, when sending, to the terminal device, the first indication information that is specific to the entire aggregation window and that is the TB and CBG quantity in the slot outside the aggregation window and the at least one first slot, the base station further needs to send second indication information in the slot outside the aggregation window to the terminal device, to ensure that the terminal device can determine the first indication information specific to the entire aggregation window based on the first indication information and the second indication information.

In a first implementation, after the specific content of the first indication information sent by the base station to the terminal device is determined, the manner of sending the first indication information also includes but is not limited to the following three manners. The following separately provides descriptions.

In a first sending manner, the base station sends the indication information to the terminal device in the slot outside the aggregation window by using DCI. The DCI has a specific format or specific frequency domain information, to indicate to the terminal device that the DCI carries the first indication information.

In this embodiment of this application, the indication information is carried in the DCI and sent, and the base station may indicate, in the following two manners, to the terminal device that the DCI carries the first indication information.

In a first manner, the DCI has the specific format, for example, a format 1/2/3. Using the format 1 as an example, when determining, through blind channel detection of the base station, that the DCI is in the format 1, the terminal device can determine that the DCI carries the first indication information. In this manner, only the control information is sent in the DCI, there is and no data information. The DCI indicates that the indication information is the last piece of first indication information specific to one aggregation window or first indication information corresponding to the last N slots.

In a second manner, the DCI has the specific frequency domain information. For example, if the frequency domain information of the DCI corresponds to a same start position and end position, it indicates that no data is scheduled in the DCI, and the DCI includes related content of the first indication information. Alternatively, a frequency domain position indicated by the frequency domain information is less than a minimum frequency domain position in which the terminal device can be scheduled, or a format of the frequency domain information is a specific value, or a frequency domain area that cannot be used by the terminal device is scheduled by using the frequency domain information, to indicate to the terminal device that the DCI carries the first indication information.

In a second sending manner, the base station sends the indication information to the terminal device in the slot outside the aggregation window by using a PDSCH, and uses DCI to indicate to the terminal device that the PDSCH carries the first indication information.

In the second sending manner, the first indication information is carried in the PDSCH and sent, and the DCI is used to indicate to the terminal device that the PDSCH carries the first indication information.

In a third sending manner, the base station sends the indication information to the terminal device in the slot outside the aggregation window by using DCI. The indication information includes first indication information and information about the aggregation window.

In this embodiment of this application, the information about the aggregation window corresponding to the first indication information may be explicitly or implicitly indicated in the DCI, for example, a size of the aggregation window, time domain information of the aggregation window, or frequency domain information of the aggregation window.

In a second manner, the base station sends, to the terminal device in a scheduled slot and/or dedicated slot in the aggregation window, indication information used to indicate the first indication information and the second indication information.

In this embodiment of this application, the scheduled slot is a slot in which data needs to be scheduled, and the dedicated slot is a slot that is specially used to send control information, for example, DCI information, to the terminal device. The following separately describes the following cases: The base station sends, to the terminal device in the scheduled slot in the aggregation window, the indication information used to indicate the first indication information and the second indication information; the base station sends, to the terminal device in the dedicated slot in the aggregation window, the indication information used to indicate the first indication information; and the base station sends, to the terminal device in the scheduled slot in the aggregation window, the indication information used to indicate the first indication information and the second indication information, and to the terminal device in the dedicated slot in the aggregation window, the indication information used to indicate the first indication information.

(1) The base station sends, to the terminal device in the scheduled slot in the aggregation window, the indication information used to indicate the first indication information and the second indication information.

Still referring to FIG. 6, the base station sends, to the terminal device in each slot of the CC0 to the CCn, the indication information used to indicate the first information and the second indication information. For example, the indication information is sent explicitly. The base station sends the first indication information and the second indication information (1/4) in the $1^{st}$ slot of the CC0, the base station sends the first indication information and the second indication information (3/4) in the $1^{st}$ slot of the CC1, the base station sends the first indication information and the second indication information (4/4) in the $1^{st}$ slot of the CCn, the base station sends the first indication information and the second indication information (6/6) in the $2^{nd}$ slot of the CC1, the base station sends the first indication information and the second indication information (7/9) in the $2^{nd}$ slot of the CC0, and the base station sends the first indication information and the second indication information (9/9) in the $3^{rd}$ slot of the CC1. The rest may be deduced by analogy, until the aggregation window ends, so that the terminal device can accurately obtain a HARQ feedback sequence and a feedback bit quantity of HARQ feedback information.

(2) The base station sends, to the terminal device in the dedicated slot in the aggregation window, the indication information used to indicate the first indication information. The first indication information is a sum of TB and CBG quantities in a reference slot within a range from a start slot to the dedicated slot in the aggregation window and at least one first slot.

Still referring to FIG. 8, the dedicated slot is a second slot of the CCn. Using the $1^{st}$ slot of the CC1 as a reference slot, a sum of TB and CBG quantities in at least one first slot having a same start moment as the reference slot is 3; using the $2^{nd}$ slot of the CC1 as a reference slot, a sum of TB and CBG quantities in at least one first slot having a same start moment as the reference slot is 2; using the 3$^{rd}$ slot of the CC1 as a reference slot, a sum of TB and CBG quantities in at least one first slot having a same start moment as the reference slot is 3, 8 in total. In other words, the first indication information is 8.

(3) The base station sends, to the terminal device in the scheduled slot in the aggregation window, the indication information used to indicate the first indication information and the second indication information, and send, to the terminal device in the dedicated slot in the aggregation window, the indication information used to indicate the first indication information.

In this embodiment of this application, referring to FIG. 6, the first indication information and the second indication information are sent in the scheduled slot in the aggregation window, namely, each slot of the CC1 shown in FIG. 6, and TB and CBG quantities in a reference slot within a range from the start moment to the dedicated slot in the aggregation window and at least one first slot are also sent in the dedicated slot, namely, a moment corresponding to the positions marked by the dashed lines shown in FIG. 6. A calculation manner of the first indication information and the second indication information that are sent in each slot of the CC is the same as that of (1), and a calculation manner of the first indication information sent at a moment T2 is the same as that of (2). Details are not described herein.

In this embodiment of this application, a sending manner of the first indication information and the second indication information in the second manner may be the same as the first sending manner, the second sending manner, or the third sending manner in the first manner. Details are not described herein.

In this embodiment of this application, in addition to the foregoing three manners, the first indication information in the second manner may be sent in the following manner. Details are as follows.

When a quantity of times for sending, by the base station in the aggregation window, the indication information used to indicate the first indication information specific to the entire aggregation window is less than a preset value, the base station repeatedly sends, in the aggregation window by using the plurality of component carriers or by using different slots of a component carrier having a shortest slot length, the indication information used to indicate the first indication information.

The manner of repeatedly sending the indication information by using the plurality of component carriers is described below.

Figure 9:
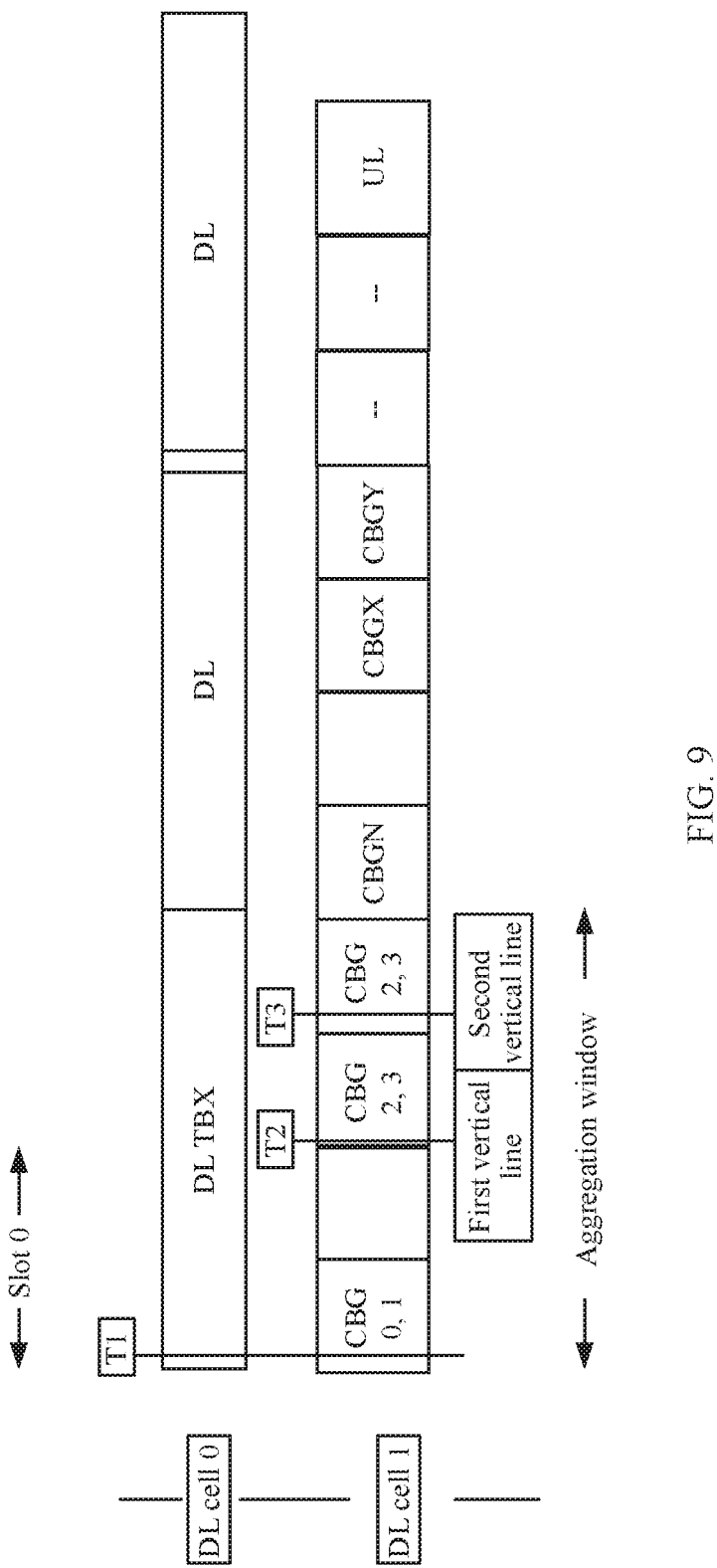
FIG. 9 is a schematic diagram of sending first indication information by using different component carriers according to an embodiment of this application.

Referring to FIG. 9, at a moment marked by a first vertical line in the aggregation window, the base station has data CBG2 and CBG3 to be scheduled to the terminal device. In this case, the indication information is sent. If no TB or CBG needs to be sent to the terminal device at a moment marked by a second vertical line, because the first indication information specific to the entire aggregation window is sent only once at the moment marked by the first vertical line, to improve reliability of sending the first indication information by the base station to the terminal device, the base station sends, at the moment marked by the second vertical line, the same first indication information as that sent at the moment marked by the first vertical line. Certainly, a data packet sent at the moment marked by the first vertical line may also be sent once at the moment marked by the second vertical line. When finding that the indication information received at the moment marked by the second vertical line is the same as that received at the moment marked by the first vertical line, the terminal device considers that the first indication information is the indication information specific to the entire aggregation window.

The manner of repeatedly sending the indication information by using the different slots in the component carrier having the shortest slot length is described below.

Figure 10:
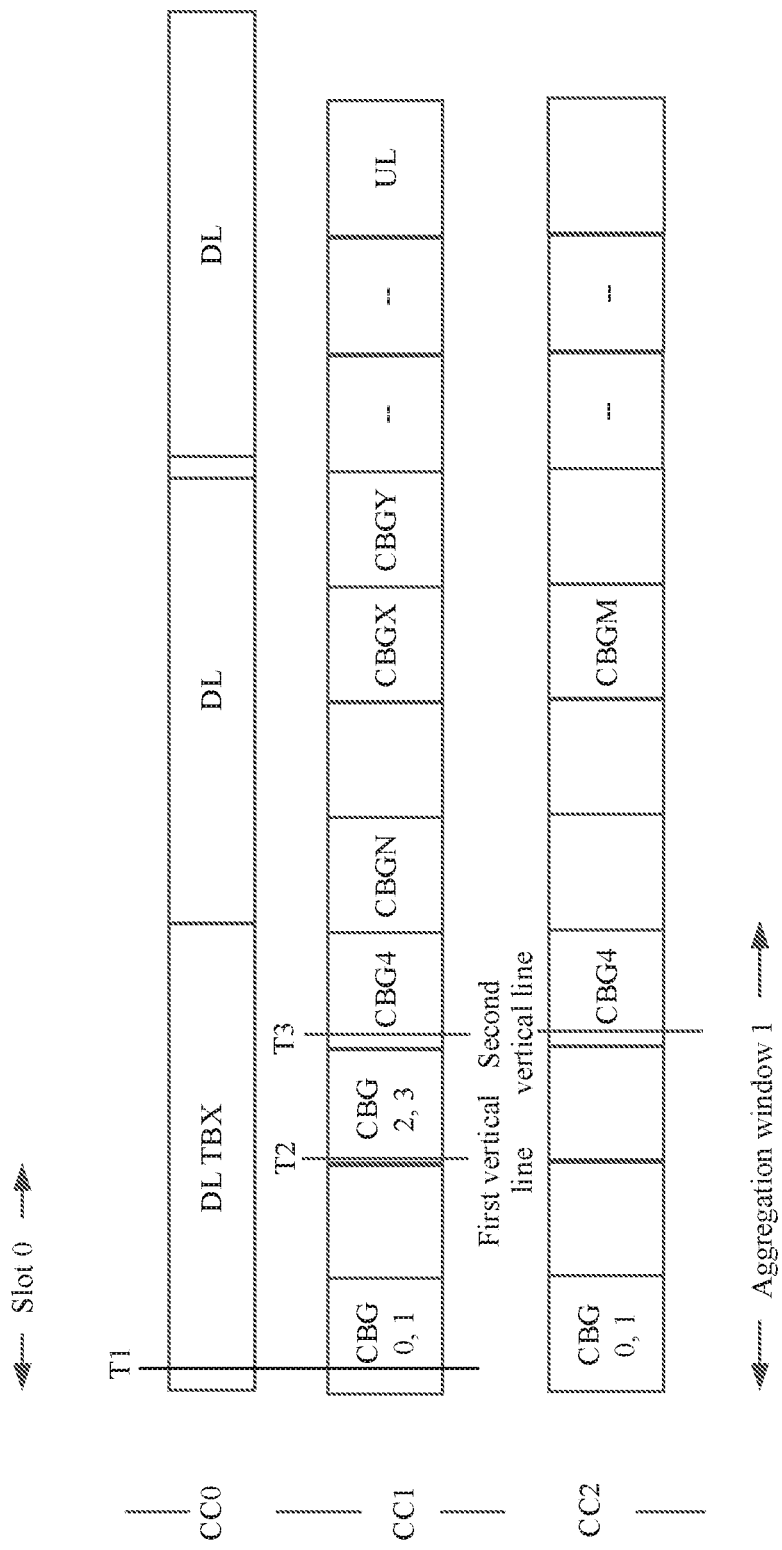
FIG. 10 is a schematic diagram of sending first indication information by using different slots of a component carrier having a shortest slot length according to an embodiment of this application.

Referring to FIG. 10, at a moment marked by a second vertical line, the base station has data CBG4 to be sent to the terminal device in the CC1, and also sends the first indication information. Because the base station sends the first indication information only once in the CC1, if the UE does not correctly receive the first indication information, a result in the entire aggregation window has an error. To improve reliability of sending the first indication information by the base station to the terminal device, the base station sends the first indication information at the moment marked by the second vertical line of the CC2. In this embodiment of this application, the second indication information may further be included, or the first indication information and the second indication information are sent together. In this case, at the moment marked by the second vertical line of the CC2, the data packet sent at the moment marked by the second vertical line of the CC1 may be sent or may not be sent.

In a third manner, the base station sends, to the terminal device in the scheduled slot and/or dedicated slot in the aggregation window, the indication information used to indicate the first indication information and the second indication information, and the base station sends, to the terminal device in the slot outside the aggregation window; the indication information used to indicate the first indication information.

In this embodiment of this application, a premise that the base station sends, to the terminal device in the slot outside the aggregation window, the indication information used to indicate the first indication information is that an amount of the indication information that is sent by the base station to the terminal device and that is used to indicate the first indication information specific to the entire aggregation window is less than a preset value, for example, when the reference slot is the slot having the shortest slot length among those of the plurality of component carriers, and a quantity of component carriers having the shortest slot length among those of the plurality of component carriers is less than the preset value.

The preset value may be 1 or 2. For example, the preset value is 2. When the quantity of the component carriers having the shortest slot length among those of in the plurality of component carriers is less than 2, the indication information used to indicate the first indication information specific to the entire aggregation window is sent only once in the aggregation window. This can ensure reliability of sending the first indication information to the terminal device.

The base station sends, to the terminal device in each slot of the CC0 to the CCn, the indication information used to indicate the first information and the second indication information. For example, the indication information is sent explicitly. The base station sends the first indication information and the second indication information (1/4) in the 1$^{st}$ slot of the CC0, the base station sends the first indication information and the second indication information (3/4) in the 1$^{st}$ slot of the CC1, the base station sends the first indication information and the second indication information (4/4) in the 1$^{st}$ slot of the CCn, the base station sends the first indication information and the second indication information (6/6) in the 2$^{nd}$ slot of the CC1, the base station sends the first indication information and the second indication information (7/9) in the $2^{nd}$ slot of the CC0, and the base station sends the first indication information and the second indication information (9/9) in the $3^{nd}$ slot of the CC1. The rest may be deduced by analogy, until the aggregation window ends. Then, the first indication information is sent in the slot outside the aggregation slot, and is a TB and CBG quantity in the entire aggregation window, namely, 16.

In the third manner, the network device sends, to the terminal device in the designated slot outside the aggregation window, the indication information used to indicate the first indication information. The designated slot herein is the same as the "designated slot" in the first manner. Details are not described herein.

In the third manner, manners of sending the first indication information and the second indication information in each slot in the aggregation window, and the first indication information in the slot outside the aggregation window are the same as the three sending manners in the first manner. Details are not described herein.

In a fourth manner, in this embodiment of this application, the base station may further sends, to the terminal device in the dedicated slot in the aggregation window and the slot outside the aggregation window, the indication information used to indicate the first indication information. The first indication information sent by the base station in the dedicated slot in the aggregation window is a sum of TB and CBG quantities in a reference slot within a range from the start slot to the dedicated slot in the aggregation window and at least one first slot, and the first indication information sent by the base station in the slot outside the aggregation window is a sum of TB and CBG quantities in a reference slot in the aggregation window and at least one first slot. For example, still referring to FIG. 8, the indication information that is used to indicate the first indication information and that is sent by the base station in the dedicated slot in the aggregation window is 0/8, and when the base station sends, in the slot outside the aggregation window, the indication information used to indicate the first indication information, the first indication information is 8/16.

S403: The terminal device sends the HARQ feedback information to the base station based on the indication information.

In this embodiment of this application, the HARQ feedback information is any one or more of ACK information, NACK information, and DXT information. The HARQ feedback information may be TB-level feedback information, CBG-level feedback information, or TB-level and CBG-level feedback information. For a TB level, one TB corresponds to a specific bit quantity of feedback information. For a CBG level, when one TB includes at least one CBG level, each CBG corresponds to a specific bit quantity of feedback information.

In this embodiment of this application, when content of the indication information sent by the base station is different, corresponding content of the indication information received by the terminal is also different. The following separately provides descriptions.

1. The terminal device receives the indication information that is used to indicate the first indication information and that is sent by the base station in the slot outside the aggregation window.

In this case, when the base station sends the indication information in different manners, the terminal device also identifies the first indication information in different manners. The following separately provides descriptions.

When the base station sends the indication information in the slot outside the aggregation window by using the DCI, the terminal confirms, based on the specific format or the specific frequency domain information of the DCI, that the DCI carries the first indication information.

Alternatively, when the base station sends the indication information in the slot outside the aggregation window by using the PDSCH, the terminal confirms, by using the DCI sent by the base station, that the PDSCH carries the first indication information.

The first indication information herein is the indication information specific to the entire aggregation window, that is, the sum of TB and CBG quantities in the reference slot in the aggregation window and the at least one first slot. After obtaining the first indication information, the terminal device determines the HARQ feedback information based on the obtained first indication information.

Referring to FIG. 8, for example, the indication information received by the terminal is 16, that is, the terminal device receives, at the moment T2 by using the CC0, the CC1, and the CC2, 16 sent by the base station. After obtaining 16, the terminal device can determine that the feedback bit quantity of the HARQ feedback information that needs to be fed back at the moment T2 is 16. If the terminal receives, at the moment T2, 16 TBs and/or CBGs sent by the base station, and all of the 16 TBs and/or CBGs are received correctly, feedback information fed back at the moment T2 is 11111111 11111111. If the terminal device receives, at the moment T2, 16 TBs and/or CBGs sent by the base station, but only 15 TBs or CBGs can be received correctly, it indicates that one TB or CBG is not correctly received in the aggregation window. In this case, feedback information fed back at the moment T2 is 0000 0000 0000 0000.

In this embodiment of this application, the first indication information received by the terminal device may further include information about the aggregation window corresponding to the first indication information, for example, a size of the aggregation window, time domain information of the aggregation window, or frequency domain information of the aggregation window.

2. The terminal device receives the indication information that is used to indicate the first indication information and that is sent by the base station in the dedicated slot in the aggregation window, and the indication information that is used to indicate the first indication information and that is sent in the slot outside the aggregation window.

The first indication information is the sum of the TB and CBG quantities in the reference slot in the aggregation window and the at least one first slot, the TB and CBG quantities in the reference slot within the range from the start slot to the dedicated slot in the aggregation window and the at least one first slot.

Referring to FIG. 8, the indication information (0/8) and (8/16) received by the terminal is used as an example. In other words, by using the CC0, the CC, and the CC2, the terminal device receives, at the moment T1, 0/8 sent by the base station and receives, at the moment T2, 8/16 sent by the base station. After obtaining the indication information (0/8) and (8/16), the terminal device can determine that a quantity of feedback bits of HARQ feedback information that need to be fed back at the moment T1 is 8, and a quantity of feedback bits of the HARQ feedback information that need to be fed back between the moments T1 and T2 is also 8. In this way, after the terminal receives the TBs and the CBGs sent by the base station, if eight TBs and/or CBGs are correctly received at the moment T1, feedback information fed back at the moment T1 is 11111111; or if eight TBs and/or CBGs are received between the moments T1 and T2, but an actual quantity of correctly received TBs or CBGs is 7, it indicates that one TB or CBG is not received correctly, and feedback information fed back at the moment T2 is 00000000.

3. The terminal device receives the indication information that is used to indicate the first indication information and the second indication information and that is sent by the base station in the scheduled slot and/or dedicated slot in the aggregation window.

In this manner, when the base station determines that the indication information used to indicate the first indication information specific to the entire aggregation window is sent only once, the terminal device may repeatedly receive, in the plurality of different component carriers or the different slots of the component carrier having the shortest slot length, the indication information used to indicate the first indication information specific to the entire aggregation window. When receiving the indication information for a plurality of times, the terminal device can determine that the first indication information carried in the indication information is the indication information specific to the entire aggregation window.

Still referring to FIG. 6, the indication information (1/4), (3/4), and (4/4) received by the terminal is used as an example. In other words, the terminal device receives, at slots n by using the CC0, the CC1, and the CC2, the indication information (1/4), (3/4), and (4/4) sent by the base station. After obtaining the indication information (1/4), (3/4), and (4/4), the terminal device can determine that the quantity of feedback bits of the HARQ feedback information that need to be fed back is 4. When a TB is correctly received in the $1^{st}$ slot of the CC0, a HARQ feedback bit that needs to be fed back is 1, and a feedback sequence is first in order; when two CBGs are correctly received in the $1^{st}$ slot of the CC1, HARQ feedback bits that need to be fed back is 11, and a feedback sequence is second in order, when one TB is not received correctly in the $1^{st}$ slot of the CCn, no HARQ feedback bit needs to be fed back, and a feedback sequence is third in order. In this way, the feedback information that needs to be fed back by the terminal is 1110. Correspondingly, after receiving the feedback information fed back by the terminal, the base station can also determine, based on the first indication information, a corresponding CC and a corresponding slot in the feedback bit information.

Still referring to FIG. 3, the base station allocates the plurality of cells to the terminal device in the first aspect. However, in a second aspect, it is assumed that the base station allocates one cell to the terminal device, the cell corresponds to one component carrier, and the component carrier includes four slots, denoted as a slot n to a slot (n+3). Because an HARQ timing relationship in an NR system is configurable dynamically, HARQ feedback information in the slot n to the slot (n+3) may be fed back by using one PUCCH. To enable the network device to identify feedback information from the terminal device, at least a bit quantity fed back by the terminal device needs to be determined between the network device and the terminal device.

In view of this, the embodiments of this application provide the following two technical solutions. The following separately provides descriptions.

In a first technical solution, the base station sends first indication information to the terminal device in a scheduled slot and/or dedicated slot in an aggregation window, and sends, to the terminal device in a slot outside the aggregation window, indication information used to indicate the first indication information. The first indication information sent to the terminal in the scheduled slot in the aggregation window is information amounts corresponding to a data channel and/or information amounts corresponding to a control channel that are in each slot and a slot preceding each slot, and the first indication information sent to the terminal device in the slot outside the aggregation window is information amounts corresponding to the data channel and/or information amounts corresponding to the control channel that are in all slots in the aggregation window.

In a second technical solution, the base station sends first indication information to the terminal device in a slot outside an aggregation window, and the first indication information includes a sum of information amounts corresponding to a data channel and/or information amounts corresponding to a control channel that are in all slots in the aggregation window.

A definition of the aggregation window is the same as the definition of the "aggregation window" in the first aspect. An information amount corresponding to the data channel and an information amount corresponding to the control channel are the same as the description about "information amount corresponding to a data channel and information amount corresponding to a control channel" in the first aspect. Details are not described herein.

In a third aspect, in the prior art, when a terminal device learns that a network device sends a transport block (TB), but the terminal device detects no downlink control information (DCI) of the TB, the terminal device feeds back CBG-level feedback information.

Figure 11:
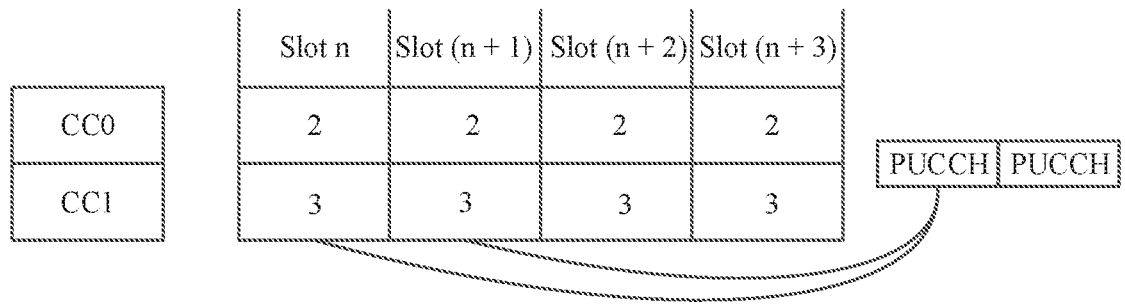
FIG. 11 is a schematic diagram of feeding back HARQ feedback information by a terminal device in the prior art.

Referring to FIG. 11, it is assumed that the terminal device activates two component carriers, denoted as a CC0 and a CC1 and that each CC includes four slots, denoted as a slot n to a slot (n+3) (namely, a Slot n to a Slot (n+3)). HARQ feedback information corresponding to TBs sent in a slot n and a slot (n+1) of the CC0 and HARQ feedback information corresponding to TBs sent in a slot n and a slot (n+1) of the CC1 are sent on the $1^{st}$ PUCCH, namely, $n_{PUCCH,j}^{(1)}$, and HARQ feedback information corresponding to TBs sent in a slot (n+2) and a slot (n+3) of the CC0 and HARQ feedback information corresponding to TBs sent in a slot (n+2) and a slot (n+3) of the CC1 are sent on the $2^{nd}$ PUCCH, namely, $n_{PUCCH,j}^{(2)}$, shown in Table A below. One TB is transmitted in each CC, and one TB includes at least one code block group (CBG). For example, in the CC0, one TB in the slot n includes two CBGs, and one TB in the slot (n+1) includes two CBGs; and in the CC1, one TB in the slot n includes three CBGs, and one TB in the slot (n+1) includes two CBGs.

Specifically, it is assumed that the terminal device specifies bit information fed back for each TB, and 4 bits is used as an example. When the terminal device receives two CBGs in the slot n of the CC0, and correctly receives one of the two CBGs; and receives two CBGs in the slot (n+1) of the CC0, and correctly receives the two CBGs; and detects no DCI corresponding to the TBs in the slot n and the slot (n+1), that is, DCI in the slot n is lost, the HARQ feedback information fed back by the terminal is ACK and NACK; discontinuous transmission (DTX), DTX, and DTX; ACK and ACK, and DTX, DTX, and DTX. For details, refer to Table A below. In this technical solution, the HARQ feedback information fed back by the terminal is a CBG-level feedback. Consequently, signaling overheads are increased.

TABLE A

| CC0 | CC1 | Resource | Constellation | RM code Input bits |
|---|---|---|---|---|
| ACK, NACK | DTX, DTX, DTX | $n_{PUCCH,i}^{(1)}$ | 1, 1 | 1, 0, 0, 0 |
| ACK, ACK | DTX, DTX, DTX | $n_{PUCCH,i}^{(1)}$ | 1, 0 | 1, 1, 0, 0 |
| ACK, ACK | ACK, DACK, ACK | $n_{PUCCH,i}^{(2)}$ | 1, 0 | 1, 1, 0, 1 |
| ... | ... | ... | ... | ... |

In view of this, according to the hybrid automatic repeat request HARQ feedback method provided in the embodiments of this application, when downlink control information corresponding to a transport block is not lost, the terminal device feeds back feedback information corresponding to a CBG, or when downlink control information corresponding to a transport block is lost, the terminal device feeds back feedback information corresponding to the TB, to reduce signaling overheads while ensuring feedback accuracy, thereby saving system resources.

With reference to the accompanying drawings, the following describes the technical solutions provided in the embodiments of this application. That the technical solutions provided in this application are applied to the application scenario shown in FIG. 3 and a network device is a base station is used as an example in the following description process.

Figure 12:
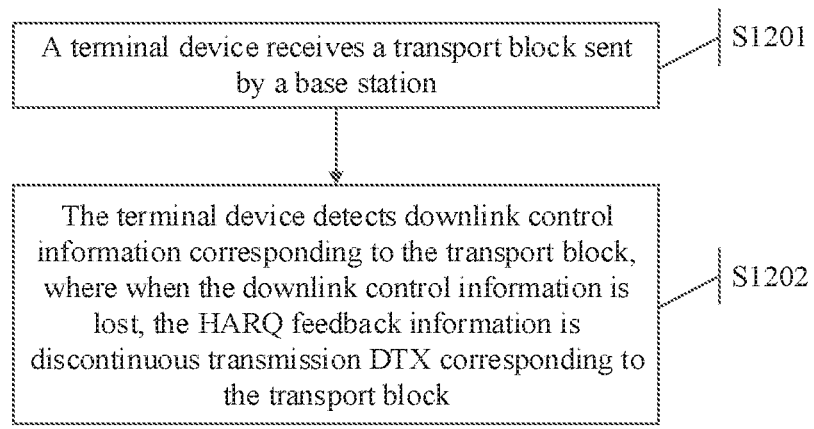
FIG. 12 is a flowchart of a hybrid automatic repeat request HARQ feedback method according to an embodiment of this application.

Referring to FIG. 12, an embodiment of this application provides a method for feeding back HARQ feedback information. A process of the method is described as follows:

S1201: A terminal device receives a transport block sent by a base station, where the transport block includes at least one code block group CBG, and the CBG is a basic unit for sending the transport block.

S1202: The terminal device detects downlink control information corresponding to the transport block, and sends HARQ feedback information to the base station based on a detection result.

When the downlink control information is lost, the HARQ feedback information is discontinuous transmission DTX corresponding to the transport block.

In this embodiment of this application, the base station may send one transport block, two transport blocks, or three transport blocks. When there are a plurality of TBs, the base station may send the TBs in a same slot by using a plurality of CCs or in different slots by using one CC. A CC0 and a CC1 may have a same slot length or different slot lengths.

That CCs are the CC0 and the CC1, and the CC0 and the CC1 have the same slot length is used as an example in the following description process. The base station sends a TB to the terminal device by using the CC0 and the CC1, and each transport block includes at least one code block group. Still referring to FIG. 11, in the slot n and the slot (n+1) shown in FIG. 11, in the CC0, one TB in the slot n includes two CBGs, and one TB in the slot (n+1) includes two CBGs; and in the CC1, one TB in the slot n includes three CBGs, and one TB in the slot (n+1) includes three CBGs.

In this embodiment of this application, when receiving the TB sent by the base station, the terminal device further receives DCI information that corresponds to the TB and that is sent by the base station. The DCI carries first indication information and second indication information. In this case, the terminal device determines, based on the first indication information and the second indication information, a feedback sequence and feedback bits for feeding back the HARQ feedback information. Calculation of the first indication information and the second indication information herein is the same as the calculation method shown in FIG. 1. However, when the CC0 and the CC1 have different slot lengths, calculation of the first indication information and the second indication information is the same as the technical solutions specific to the component carriers having different slot lengths in the first aspect.

Specifically, if the CC0 receives two CBGs in the slot n and correctly receives one of the two CBGs; receives two CBGs in the slot (n+1) and correctly receives the two CBGs; but detects no DCI corresponding to the TB in the slot n and the slot (n+1) of the CC1, by using the technical solution provided in this embodiment of this application, when the DCI in the slot n and the slot (n+1) is lost, the terminal device feeds back DTX corresponding to the TB, that is, ACK and NACK; DTX; ACK and ACK; and DTX. In this embodiment of this application, when the terminal device can detect the DCI corresponding to the TB and correctly receive the CBG sent by the base station, the HARQ feedback information is fed back based on a CBG level. When the terminal device detects no DCI corresponding to the TB, that is, when the DCI is lost, the HARQ feedback information is based on a TB level. Compared with Table A, Table B provided in this embodiment of this application is simpler. This can reduce a HARQ feedback status, and reduce a quantity of bits that need to be fed back, thereby reducing signaling overheads while ensuring feedback accuracy.

TABLE B

| CC0 | CC1 | Resource | Constellation | RM code Input bits |
|---|---|---|---|---|
| ACK, NACK | DTX | $n_{PUCCH,i}^{(1)}$ | 1, 1 | 1, 0, 0, 0 |
| ACK, ACK | DTX | $n_{PUCCH,i}^{(1)}$ | 1, 0 | 1, 1, 0, 0 |
| ACK, ACK | ACK, DACK, ACK | $n_{PUCCH,i}^{(2)}$ | 1, 0 | 1, 1, 0, 1 |
| ... | ... | ... | ... | |

In this embodiment of this application, the DTX fed back by the terminal device is agreed upon between the terminal device and the base station. When receiving the DTX fed back by the terminal device, the base station can determine that the terminal device detects no DCI, and needs to send a CBG of the TB again.

Apparatuses provided in the embodiments of this application are described below with reference to the accompanying drawings.

Figure 13:
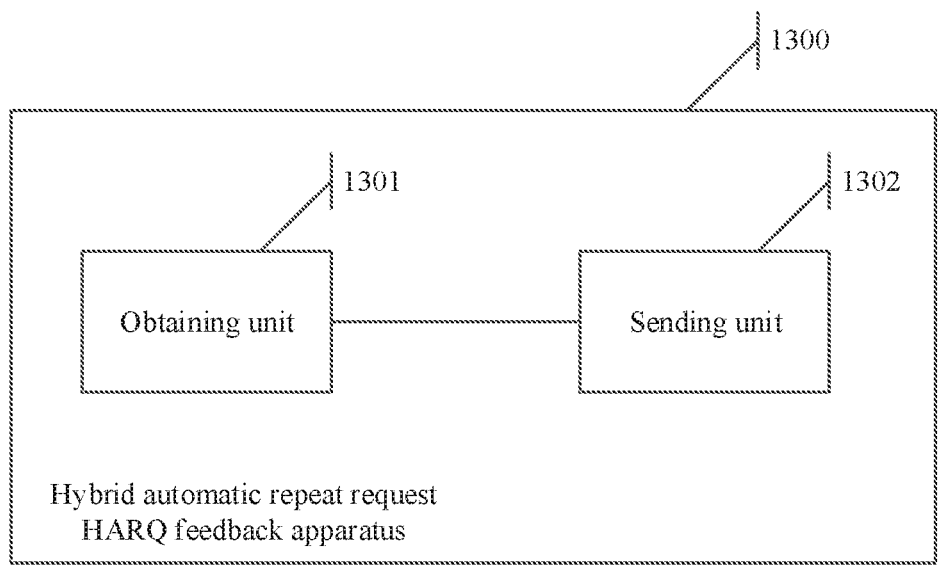
FIG. 13 is a schematic structural diagram of a hybrid automatic repeat request HARQ feedback apparatus according to an embodiment of this application.

FIG. 13 is a schematic structural diagram of a hybrid automatic repeat request HARQ feedback apparatus 1300. The hybrid automatic repeat request HARQ feedback apparatus 1300 may include an obtaining unit 1301 and a sending unit 1302. The obtaining unit 1301 may be configured to perform S401 in the embodiment shown in FIG. 4, and/or configured to support another process of the technology described in this specification. The sending unit 1302 may be configured to perform S402 in the embodiment shown in FIG. 4, and/or configured to support another process of the technology described in this specification. All related content of the steps in the foregoing method embodiment may be cited in function descriptions of corresponding function modules, and details are not described herein.

Figure 14:
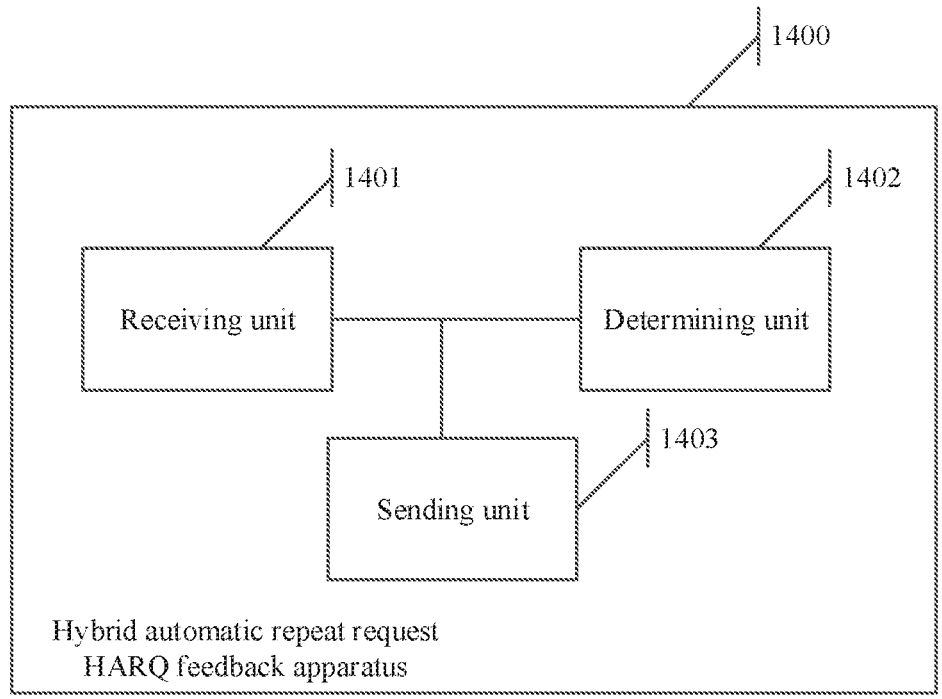
FIG. 14 is a schematic structural diagram of a hybrid automatic repeat request HARQ feedback apparatus according to an embodiment of this application.

FIG. 14 is a schematic structural diagram of a hybrid automatic repeat request HARQ feedback apparatus 1400. The hybrid automatic repeat request HARQ feedback apparatus 1400 may include a receiving unit 1401, a determining unit 1402, and a sending unit 1403. The receiving unit 1401 may be configured to perform S402 in the embodiment shown in FIG. 4, and/or configured to support another process of the technology described in this specification. The determining unit 1402 and the sending unit 1403 are configured to perform S403 in the embodiment shown in FIG. 4, and/or configured to support a technical process described in this specification. All related content of the steps in the foregoing method embodiment may be cited in function descriptions of corresponding function modules, and details are not described herein.

Figure 15:
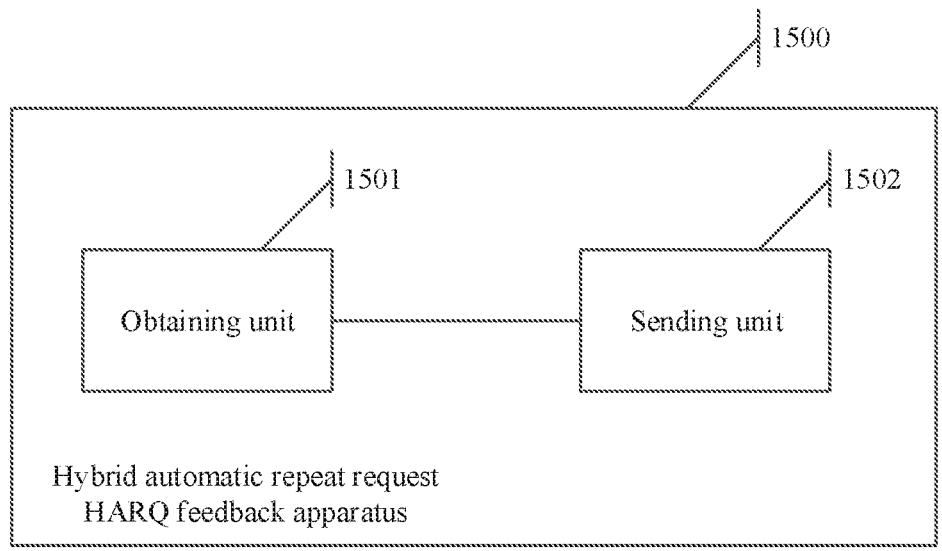
FIG. 15 is a schematic structural diagram of another hybrid automatic repeat request HARQ feedback apparatus according to an embodiment of this application.

FIG. 15 is a schematic structural diagram of a hybrid automatic repeat request HARQ feedback apparatus 1500. The hybrid automatic repeat request HARQ feedback apparatus 1500 may include an obtaining unit 1501 and a sending unit 1502. The obtaining unit 1501 and the sending unit 1502 are configured to perform the steps in the embodiment shown in the third aspect. All related content of the steps in the foregoing method embodiment may be cited in function descriptions of corresponding function modules, and details are not described herein.

Figure 16:
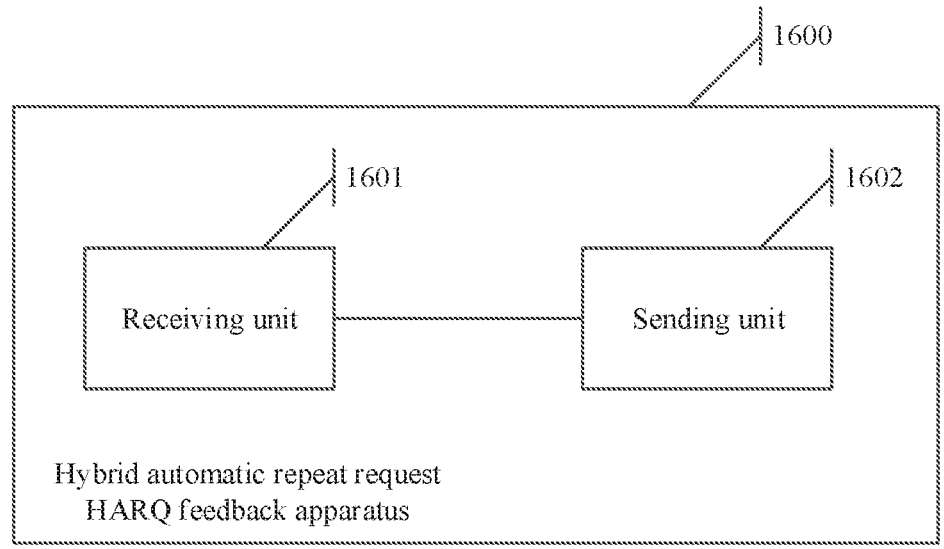
FIG. 16 is a schematic structural diagram of another hybrid automatic repeat request HARQ feedback apparatus according to an embodiment of this application.

FIG. 16 is a schematic structural diagram of a hybrid automatic repeat request HARQ feedback apparatus 1600. The hybrid automatic repeat request HARQ feedback apparatus 1600 includes a receiving unit 1601 and a sending unit 1602. The receiving unit 1601 is configured to perform S1201 in the embodiment shown in FIG. 12, and/or configured to support another process of the technology described in this specification. The sending unit 1602 is configured to perform S1202 in the embodiment shown in FIG. 12, and/or configured to support another process of the technology described in this specification. All related content of the steps in the foregoing method embodiment may be cited in function descriptions of corresponding function modules, and details are not described herein.

In this embodiment of this application, the hybrid automatic repeat request HARQ feedback apparatus 1300, the hybrid automatic repeat request HARQ feedback apparatus 1400, the hybrid automatic repeat request HARQ feedback apparatus 1500, and the hybrid automatic repeat request HARQ feedback apparatus 1600 are presented in a form in which function modules are divided according to corresponding functions, or may be presented in a form in which function modules are divided in an integrated manner. The "module" herein may be an application-specific integrated circuit (ASIC), a processor and a memory that execute one or more software or firmware programs, an integrated logic circuit, and/or another device that can provide the foregoing functions.

Figure 17:
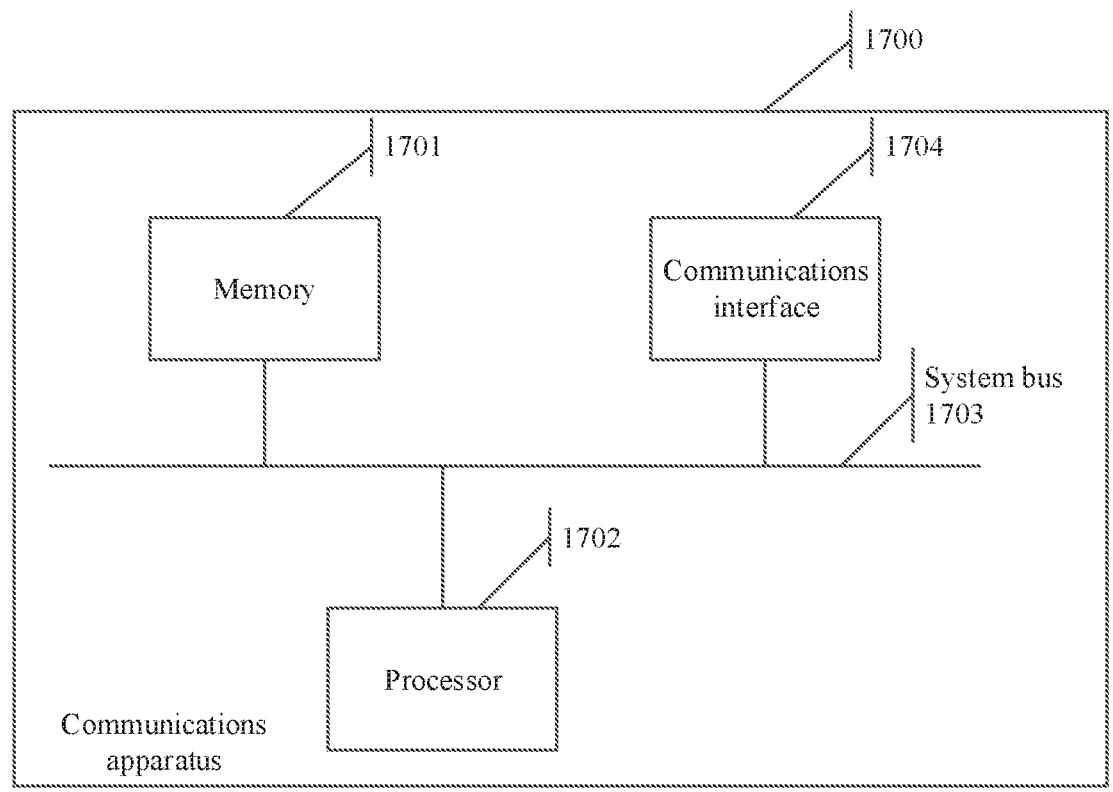
FIG. 17 is a schematic structural diagram of a communications apparatus according to an embodiment of this application.

In a simple embodiment, a person skilled in the art may figure out that any one of the hybrid automatic repeat request HARQ feedback apparatus 1300, the hybrid automatic repeat request HARQ feedback apparatus 1400, the hybrid automatic repeat request HARQ feedback apparatus 1500, and the hybrid automatic repeat request HARQ feedback apparatus 1600 may be implemented by using a structure shown in FIG. 17.

As shown in FIG. 17, a communications apparatus 1700 may include a memory 1701, a processor 1702, a system bus 1703, and a communications interface 1704. The processor 1702, the memory 1701, and the communications interface 1704 are connected by using the system bus 1703. The memory 1701 is configured to store a computer execution instruction. When the communications apparatus 1700 runs, the processor 1702 executes the computer execution instruction stored in the memory 1701, so that the communications apparatus 1700 performs the hybrid automatic repeat request HARQ feedback method provided in the embodiment shown in FIG. 4 or the embodiment shown in the second aspect or the embodiment shown in FIG. 12. For the specific hybrid automatic repeat request HARQ feedback method, refer to the foregoing descriptions and related descriptions in the accompanying drawings. Details are not described herein. The communications interface 1704 may be a transceiver, or may be an independent receiver and transmitter.

In an example, the sending unit 1302 may correspond to the communications interface 1704 in FIG. 17. The obtaining unit 1301 may be built in or independent of the processor 1702 of the communications apparatus 1700 in a form of hardware/software.

In an example, the receiving unit 1401 and the sending unit 1403 may correspond to the communications interface 1704 in FIG. 17. The determining unit 1402 may be built in or independent of the processor 1702 of the communications apparatus 1700 in a form of hardware/software.

In an example, the sending unit 1502 may correspond to the communications interface 1704 in FIG. 17. The obtaining unit 1501 may be built in or independent of the processor 1702 of the communications apparatus 1700 in a form of hardware/software.

In an example, the receiving unit 1601 and the sending unit 1602 may correspond to the communications interface 1704 in FIG. 17.

Optionally, the communications apparatus 1700 may be a field programmable gate array (FPGA), an application-specific integrated chip (ASIC), a system on chip (SoC), a central processing unit (CPU), a network processor (NP), a digital signal processing circuit (DSP), or a micro controller unit (MCU), or may be a programmable controller (PLD) or another integrated chip. Alternatively, the communications apparatus 1700 may be an independent network element, for example, a network device or a terminal device. The chip system includes a processor, configured to support the terminal device or a base station to implement the method in any one of the first aspect, the second aspect, or the third aspect, for example, generate or process data and/or information in the method. The chip system further includes a memory, and the memory is configured to store a program instruction and data that are necessary for the terminal device or the base station. The chip system may include a chip, or may include a chip and another discrete device.

An embodiment of this application further provides a computer storage medium. The storage medium may include a memory, and the memory may store a program. When the program is executed, all steps performed by the network device and recorded in the method embodiment shown in FIG. 4, all steps performed by the network device and recorded in the method embodiment shown in the second aspect, or all steps performed by the terminal device and recorded in the method embodiment shown in FIG. 12 are performed.

All or some of the embodiments of this application may be implemented by software, hardware, firmware, or any combination thereof. When software is used to implement the embodiments, the embodiments may be implemented completely or partially in a form of a computer program product. The computer program product includes one or more computer instructions. When the computer program instruction is loaded and executed on a computer, the procedures or functions according to the embodiments of this application are all or partially generated. The computer may be a general-purpose computer, a special-purpose computer, a computer network, or another programmable apparatus. The computer instruction may be stored in a computer-readable storage medium or may be transmitted from a computer-readable storage medium to another readable storage medium, for example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

Definitely, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method comprising:
   receiving, by a terminal device, indication information that is used to indicate at least first indication information and that is sent by a network device, wherein:
   the first indication information is obtained based on:
   at least one of information amounts corresponding to a data channel or information amounts corresponding to a control channel that are in a reference slot and at least one first slot, and
   at least one of information amounts corresponding to the data channel or information amounts corresponding to the control channel that are in slots preceding the reference slot within an aggregation window;
   wherein the reference slot and the at least one first slot each correspond to a different component carrier of a plurality of component carriers in which the terminal device is scheduled, and wherein the reference slot and the at least one first slot have a same start moment, and wherein at least two of the plurality of component carriers have different slot lengths; and
   sending, by the terminal device, hybrid automatic repeat request (HARQ) feedback information to the network device based on the indication information.

2. The method according to claim 1, wherein when there are a plurality of reference slots accumulated from a start moment of the aggregation window, the first indication information is obtained based on at least one of the information amounts corresponding to the data channel or the information amounts corresponding to the control channel that are in the reference slot and the at least one first slot, and at least one of information amounts corresponding to the data channel or information amounts corresponding to the control channel that are in the one or more slots, preceding the reference slot, corresponding to the plurality of component carriers,
   wherein the aggregation window is a set of downlink slots in which the HARQ feedback information is fed back by using one uplink control channel or one piece of uplink control information.

3. The method according to claim 2, wherein the receiving, by a terminal device, indication information that is used to indicate at least first indication information and that is sent by a network device comprises at least one of following:
   receiving, by the terminal device, indication information that is used to indicate at least one of the first indication information or second indication information and that is sent by the network device in at least one of a scheduled slot or dedicated slot in the aggregation window, wherein the second indication information is obtained based on at least one of information amounts corresponding to the data channel or information amounts corresponding to the control channel that are accumulated in a frequency-first manner from a specific moment of the aggregation window and from a first component carrier of the plurality of component carriers to a current component carrier to which a second slot corresponds, and wherein the second slot is obtained from at least one of following: the reference slot and the at least one first slot, or other slots of the component carriers; or
   receiving, by the terminal device, indication information that is used to indicate the first indication information and that is sent by the network device in a slot outside the aggregation window.

4. The method according to claim 1, wherein the receiving, by a terminal device, indication information that is used to indicate first indication information and that is sent by a network device comprises:
   receiving, by the terminal device, the indication information that is used to indicate the first indication information and that is sent by the network device, wherein the first indication information is a sum of at least one of information amounts corresponding to a data channel or information amounts corresponding to a control channel that are in a reference slot in an aggregation window and at least one first slot, or wherein the first indication information is a sum of at least one of information amounts corresponding to a data channel or information amounts corresponding to a control channel that are in a reference slot in the aggregation window and at least one first slot, and at least one of information amounts corresponding to a data channel or information amounts corresponding to a control channel that are in a reference slot outside the aggregation window and at least one first slot; or
   receiving, by the terminal device, the indication information that is used to indicate the first indication information and that is sent by the network device, wherein the first indication information is a sum of at least one of information amounts corresponding to a data channel or information amounts corresponding to a control channel that are in a reference slot within a designated slot range and at least one first slot, and wherein the designated slot range is from the start moment of the aggregation window to the designated slot or from a first designated slot of the designated slot to a second designated slot of the designated slot.

5. The method according to claim 1, wherein the receiving, by a terminal device, indication information that is used to indicate first indication information and that is sent by a network device comprises at least one of following:
   receiving, by the terminal device, the indication information sent by the network device by using downlink control information (DCI), and determining, based on a specific format or specific frequency domain information of the DCI, that the DCI carries the first indication information;
   receiving, by the terminal device, the indication information sent by the network device by using a physical downlink shared channel (PDSCH), and determining, by using DCI sent by the network device, that the PDSCH carries the first indication information;

receiving, by the terminal device, the indication information sent by the network device by using DCI, wherein the indication information comprises the first indication information and information about an aggregation window; or receiving, by the terminal device, at least one of following: the indication information that is used to indicate the first indication information and that is repeatedly sent by the network device in the aggregation window by using at least one of the plurality of component carriers, or the indication information that is used to indicate the first indication information and that is repeatedly sent by using different slots of a component carrier to which a reference slot corresponds.

6. The method according to claim 1, wherein:

the information amounts corresponding to the data channel is at least one of a transport block (TB) quantity, a code block group (CBG) quantity, a TB and CBG quantity, a DCI amount corresponding to a PDSCH, or a serving cell quantity corresponding to a PDSCH; and the information amounts corresponding to the control channel is at least one of a quantity of physical downlink control channels (PDCCHs) indicating downlink semi-persistent scheduling (SPS) release, a quantity of PDCCHs indicating downlink SPS activation, an amount of DCI that corresponds to a PDCCH and that indicates downlink SPS release, or an amount of DCI indicating downlink SPS activation.

7. The method according to claim 1, wherein the reference slot is at least one of the following:

a slot having a shortest slot length among those of the plurality of component carriers;

a slot having a longest slot length among those of the plurality of component carriers; or a slot designated among those of the plurality of component carriers, wherein the designated slot is specified in a protocol and is stored in the terminal device, or wherein the designated slot is obtained based on a configuration parameter configured by the network device for the terminal device.

8. An apparatus comprising:

at least one processor; and one or more memories coupled to the at least one processor and storing programing instructions for execution by the at least one processor to:

obtain first indication information used to instruct a terminal device to feed back hybrid automatic repeat request (HARD) feedback information, wherein the first indication information is obtained based on:
at least one of information amounts corresponding to a data channel or information amounts corresponding to a control channel that are in a reference slot and at least one first slot, and
at least one of information amounts corresponding to the data channel or information amounts corresponding to the control channel that are in slots preceding the reference slot within an aggregation window;
wherein the reference slot and the at least one first slot each correspond to a different component carrier of a plurality of component carriers serving the terminal device, wherein the reference slot and the at least one first slot have a same start moment, and wherein at least two of the plurality of component carriers have different slot lengths; and send, to the terminal device, indication information used to indicate at least the first indication information.

9. The apparatus according to claim 8, wherein when there are a plurality of reference slots accumulated from a start moment of the aggregation window, the first indication information is obtained based on at least one of the information amounts corresponding to the data channel or the information amounts corresponding to the control channel that are in the reference slot and the at least one first slot, and at least one of information amounts corresponding to the data channel or information amounts corresponding to the control channel that are in the one or more slots, preceding the reference slot, corresponding to the plurality of component carriers, wherein the aggregation window is a set of downlink slots in which the HARQ feedback information is fed back by using one uplink control channel or one piece of uplink control information.

10. The apparatus according to claim 9, wherein the one or more memories store the programing instructions for execution by the at least one processor to:

obtain second indication information used to instruct the terminal device to feed back the HARQ feedback information, wherein the second indication information is obtained based on at least one of information amounts corresponding to the data channel or information amounts corresponding to the control channel that are accumulated in a frequency-first manner from a specific moment of the aggregation window and from a first component carrier of the plurality of component carriers to a current component carrier to which a second slot corresponds, and wherein the second slot is obtained from at least one of following: the reference slot and the at least one first slot, or other slots of the component carriers.

11. The apparatus according to claim 10, wherein when sending, to the terminal device, the indication information used to indicate at least the first indication information, the one or more memories store the programing instructions for execution by the at least one processor to perform at least one of following:

sending, to the terminal device in at least one of a scheduled slot or dedicated slot in the aggregation window, indication information used to indicate at least one of the first indication information or the second indication information; or sending, to the terminal device in a slot outside the aggregation window, the indication information used to indicate the first indication information.

12. The apparatus according to claim 11, wherein when sending, to the terminal device in at least one of the scheduled slot or dedicated slot in the aggregation window, the indication information used to indicate at least one of the first indication information or the second indication information; and sending, to the terminal device in the slot outside the aggregation window, the indication information used to indicate the first indication information, the one or more memories store the programing instructions for execution by the at least one processor to:

when an amount of indication information that is used to indicate first indication information specific to an entire aggregation window and that is sent by an HARQ feedback apparatus is less than or equal to a preset value, send, to the terminal device in the slot outside the aggregation window, the indication information used to indicate the first indication information specific to the entire aggregation window.

13. The apparatus according to claim 11, wherein when sending, to the terminal device in the slot outside the aggregation window, the indication information used to indicate the first indication information, the one or more memories store the programing instructions for execution by the at least one processor to:
send, to the terminal device in a designated slot outside the aggregation window, the indication information used to indicate the first indication information specific to an entire aggregation window.

14. An apparatus comprising:
at least one processor; and
one or more memories coupled to the at least one processor and storing programing instructions for execution by the at least one processor to:
receive indication information that is used to indicate at least first indication information and that is sent by a network device, wherein the first indication information is obtained based on:
at least one of information amounts corresponding to a data channel or information amounts corresponding to a control channel that are in a reference slot and at least one first slot, and
at least one of information amounts corresponding to the data channel or information amounts corresponding to the control channel that are in slots preceding the reference slot within an aggregation window;
wherein the reference slot and the at least one first slot each correspond to a different component carrier of a plurality of component carriers in which the apparatus is scheduled, wherein the reference slot and the at least one first slot have a same start moment, and wherein at least two of the plurality of component carriers have different slot lengths;
determine hybrid automatic repeat request (HARQ) feedback information based on the indication information; and
send the HARQ feedback information to the network device.

15. The apparatus according to claim 14, wherein when there are a plurality of reference slots accumulated from a start moment of the aggregation window, the first indication information is obtained based on at least one of the information amounts corresponding to the data channel or the information amounts corresponding to the control channel that are in the reference slot and the at least one first slot, and at least one of information amounts corresponding to the data channel or information amounts corresponding to the control channel that are in the one or more slots, preceding the reference slot, corresponding to the plurality of component carriers,
wherein the aggregation window is a set of downlink slots in which the HARQ feedback information is fed back by using one uplink control channel or one piece of uplink control information.

16. The apparatus according to claim 15, wherein when receiving the indication information that is used to indicate at least the first indication information and that is sent by the network device, the one or more memories store the programing instructions for execution by the at least one processor to perform at least one of following:
receiving indication information that is used to indicate at least one of the first indication information or second indication information and that is sent by the network device in at least one of a scheduled slot or dedicated slot in the aggregation window, wherein the second indication information is obtained based on at least one of information amounts corresponding to the data channel or information amounts corresponding to the control channel that are accumulated in a frequency-first manner from a specific moment of the aggregation window and from a first component carrier of the plurality of component carriers to a current component carrier to which a second slot corresponds, and wherein the second slot is obtained from at least one of following:
the reference slot and the at least one first slot, or other slots of the component carriers; or receiving indication information that is used to indicate the first indication information and that is sent by the network device in a slot outside the aggregation window.

17. The apparatus according to claim 14, wherein when receiving the indication information that is used to indicate the first indication information and that is sent by the network device, the one or more memories store the programing instructions for execution by the at least one processor to:
receive the indication information that is used to indicate the first indication information and that is sent by the network device, wherein the first indication information is a sum of at least one of information amounts corresponding to a data channel or information amounts corresponding to a control channel that are in a reference slot in an aggregation window and at least one first slot, or wherein the first indication information is a sum of at least one of information amounts corresponding to a data channel or information amounts corresponding to a control channel that are in a reference slot in the aggregation window and at least one first slot, and at least one of information amounts corresponding to a data channel or information amounts corresponding to a control channel that are in a reference slot outside the aggregation window and at least one first slot; or
receive the indication information that is used to indicate the first indication information and that is sent by the network device, wherein the first indication information is a sum of at least one of information amounts corresponding to a data channel or information amounts corresponding to a control channel that are in a reference slot within a designated slot range and at least one first slot, and wherein the designated slot range is from the start moment of the aggregation window to the designated slot or from a first designated slot of the designated slot to a second designated slot of the designated slot.

18. The apparatus according to claim 14, wherein when receiving the indication information that is used to indicate the first indication information and that is sent by the network device, the one or more memories store the programing instructions for execution by the at least one processor to perform at least one of following:
receiving the indication information sent by the network device by using downlink control information (DCI), and determine, based on a specific format or specific frequency domain information of the DCI, that the DCI carries the first indication information;
receiving the indication information sent by the network device by using a physical downlink shared channel (PDSCH), and determine, by using DCI sent by the network device, that the PDSCH carries the first indication information;

receiving the indication information sent by the network device by using DCI, wherein the indication information comprises the first indication information and information about an aggregation window; or receiving at least one of following: the indication information that is used to indicate the first indication information and that is repeatedly sent by the network device in the aggregation window by using at least one of the plurality of component carriers, or the indication information that is used to indicate the first indication information and that is repeatedly sent by using different slots of a component carrier to which a reference slot corresponds.

19. The apparatus according to claim 14, wherein:

the information amounts corresponding to the data channel is at least one of a transport block (TB) quantity, a code block group (CBG) quantity, a TB and CBG quantity, a downlink control information DCI amount corresponding to a PDSCH, or a serving cell quantity corresponding to a PDSCH; and the information amounts corresponding to the control channel is at least one of a quantity of physical downlink control channels (PDCCHs) indicating downlink semi-persistent scheduling (SPS) release, a quantity of PDCCHs indicating downlink SPS activation, an amount of DCI that corresponds to a PDCCH and that indicates downlink SPS release, or an amount of DCI indicating downlink SPS activation.

20. The apparatus according to claim 14, wherein the reference slot is at least one of the following:

a slot having a shortest slot length among those of the plurality of component carriers;

a slot having a longest slot length among those of the plurality of component carriers; or a slot designated among those of the plurality of component carriers, wherein the designated slot is specified in a protocol and is stored in an HARQ feedback apparatus, or wherein the designated slot is obtained based on a configuration parameter configured by the network device for the HARQ feedback apparatus.

* * * * *

UNITED STATES PATENT AND TRADEMARK OFFICE
CERTIFICATE OF CORRECTION

PATENT NO. : 11,418,293 B2
APPLICATION NO. : 16/787782
DATED : August 16, 2022
INVENTOR(S) : Jie Shi et al.

It is certified that error appears in the above-identified patent and that said Letters Patent is hereby corrected as shown below:

In the Claims

In Column 35, Line 50, in Claim 8, delete "(HARD)" and insert -- (HARQ) --.

Signed and Sealed this
Eighteenth Day of April, 2023

Katherine Kelly Vidal
*Director of the United States Patent and Trademark Office*